(12) United States Patent
Jung et al.

(10) Patent No.: US 12,385,685 B2
(45) Date of Patent: Aug. 12, 2025

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR); Daewoong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/170,005

(22) Filed: Feb. 8, 2021

(65) Prior Publication Data

US 2021/0239387 A1 Aug. 5, 2021

Related U.S. Application Data

(63) Continuation of application No. 15/749,136, filed as application No. PCT/KR2016/008501 on Aug. 2, 2016, now Pat. No. 10,941,974.

(30) Foreign Application Priority Data

Aug. 3, 2015 (KR) ........................ 10-2015-0109722

(51) Int. Cl.
  *F25D 23/02* (2006.01)
  *F16L 59/065* (2006.01)
  (Continued)

(52) U.S. Cl.
  CPC .......... *F25D 23/028* (2013.01); *F16L 59/065* (2013.01); *F25D 19/006* (2013.01);
  (Continued)

(58) Field of Classification Search
  CPC ...... F25D 23/028; F25D 19/006; F25D 23/02; F25D 23/085; F25D 23/087; F25D 2201/14; F16L 59/065
  See application file for complete search history.

(56) References Cited

U.S. PATENT DOCUMENTS 1,413,169 A 4/1922 Lawton
1,588,707 A 6/1926 Csiga
(Continued)

FOREIGN PATENT DOCUMENTS

CN 1132346 10/1996
CN 1191959 9/1998
(Continued)

OTHER PUBLICATIONS

Chinese Office Action dated Apr. 6, 2021 issued in CN Application No. 202010248772.2.
(Continued)

*Primary Examiner* — David J Teitelbaum
(74) *Attorney, Agent, or Firm* — KED & ASSOCIATES, LLP

(57) ABSTRACT

A vacuum adiabatic body includes a first plate defining at least one portion of a wall of a first space; a second plate defining at least one portion of a wall of a second space having a different temperature from the first space; a seal that seals the first plate and the second plate to provide a third space that has a temperature between the temperature of the first space and the temperature of the second space and is in a vacuum state; a support to maintain the third space; an exhaust port through which a gas in the third space is exhausted; a peripheral adiabatic material, as a previously formed separate molded product, fixed to an edge of the third space; and a gasket having at least one portion fixed to (Continued)

the peripheral adiabatic material to provide a boundary between the first space and the second space.

21 Claims, 14 Drawing Sheets

(51) Int. Cl.
    *F25D 19/00*     (2006.01)
    *F25D 23/06*     (2006.01)
    *F25D 23/08*     (2006.01)

(52) U.S. Cl.
    CPC ........... *F25D 23/02* (2013.01); *F25D 23/062* (2013.01); *F25D 23/085* (2013.01); *F25D 23/087* (2013.01); *F25D 2201/14* (2013.01)

(56) References Cited

U.S. PATENT DOCUMENTS

| | | | |
|---|---|---|---|
| 1,845,353 | A | 2/1932 | Snell |
| 2,000,882 | A | 5/1935 | Comstock |
| 2,708,774 | A | 5/1955 | Seelen |
| 2,715,976 | A | 8/1955 | Whitmore |
| 2,729,863 | A | 1/1956 | Kurtz |
| 2,768,046 | A | 10/1956 | Evans |
| 2,786,241 | A | 3/1957 | Garvey et al. |
| 3,091,946 | A | 6/1963 | Kesling |
| 3,161,265 | A | 12/1964 | Matsch et al. |
| 3,289,423 | A | 12/1966 | Berner |
| 3,370,740 | A | 2/1968 | Anderson |
| 3,520,581 | A | 7/1970 | Borghi |
| 4,056,211 | A | 11/1977 | Zumwalt |
| 4,646,934 | A | 3/1987 | McAllister |
| 4,822,117 | A | 4/1989 | Boston, Jr. |
| 4,959,111 | A | 9/1990 | Kruck et al. |
| 5,011,729 | A | 4/1991 | McAllister |
| 5,018,328 | A | 5/1991 | Cur |
| 5,033,803 | A | 7/1991 | Katsuyoshi et al. |
| 5,185,981 | A | 2/1993 | Martinez |
| 5,200,015 | A | 4/1993 | Schilf |
| 5,361,598 | A * | 11/1994 | Roseen ................. F25D 23/068 165/96 |
| 5,512,345 | A | 4/1996 | Tsutsumi et al. |
| 5,532,034 | A | 7/1996 | Kirby et al. |
| 5,694,789 | A * | 12/1997 | Do .......................... F25D 23/02 312/405 |
| 5,795,639 | A | 8/1998 | Lin |
| 5,843,353 | A | 12/1998 | De Vos et al. |
| 5,947,479 | A | 9/1999 | Ostrowski |
| 6,001,890 | A | 12/1999 | Hamilton |
| 6,029,846 | A | 2/2000 | Hirath et al. |
| 6,038,830 | A | 3/2000 | Hirath et al. |
| 6,109,712 | A | 8/2000 | Haworth et al. |
| 6,168,040 | B1 | 1/2001 | Sautner et al. |
| 6,192,703 | B1 | 2/2001 | Salyer et al. |
| 6,244,458 | B1 | 6/2001 | Frysinger et al. |
| 6,338,536 | B1 | 1/2002 | Ueno et al. |
| 6,485,122 | B2 | 11/2002 | Wolf |
| 8,383,225 | B2 | 2/2013 | Rotter |
| 8,857,931 | B2 | 10/2014 | Jung et al. |
| 8,881,398 | B2 | 11/2014 | Hanley et al. |
| 8,943,770 | B2 | 2/2015 | Sanders |
| 8,944,541 | B2 | 2/2015 | Allard et al. |
| 9,182,158 | B2 | 11/2015 | Wu |
| 9,328,951 | B2 | 5/2016 | Shin |
| 9,441,779 | B1 | 9/2016 | Alshourbagy et al. |
| 9,463,918 | B2 | 10/2016 | Reid |
| 9,752,818 | B2 | 9/2017 | Naik |
| 9,791,204 | B2 | 10/2017 | Kim |
| 9,945,600 | B2 | 4/2018 | Kang |
| 10,082,328 | B2 | 9/2018 | Jung et al. |
| 2002/0041134 | A1 | 4/2002 | Wolf et al. |
| 2002/0100250 | A1 | 8/2002 | Hirath et al. |
| 2002/0170265 | A1 | 11/2002 | Tokonabe et al. |
| 2003/0080126 | A1 | 5/2003 | Voute et al. |
| 2003/0115838 | A1 | 6/2003 | Rouanet et al. |
| 2003/0207075 | A1 | 11/2003 | Maignan et al. |
| 2004/0051427 | A1 | 3/2004 | Cittadini et al. |
| 2004/0091688 | A1 | 5/2004 | Gaku |
| 2004/0226956 | A1 | 11/2004 | Brooks |
| 2005/0175809 | A1 | 8/2005 | Hirai et al. |
| 2005/0235682 | A1 | 10/2005 | Hirai et al. |
| 2007/0152551 | A1 | 7/2007 | Kim et al. |
| 2007/0204648 | A1 * | 9/2007 | Smale ................... F25D 23/126 62/440 |
| 2007/0243358 | A1 | 10/2007 | Gandini |
| 2008/0110128 | A1 | 5/2008 | Hirath |
| 2008/0289898 | A1 | 11/2008 | Rickards |
| 2009/0031659 | A1 | 2/2009 | Kalfon |
| 2009/0113899 | A1 | 5/2009 | Dain et al. |
| 2010/0104923 | A1 | 4/2010 | Takeguchi et al. |
| 2010/0178439 | A1 | 7/2010 | Bettger et al. |
| 2011/0089802 | A1 | 4/2011 | Cording |
| 2011/0146333 | A1 | 6/2011 | Koo et al. |
| 2011/0296797 | A1 | 12/2011 | Stark et al. |
| 2012/0103006 | A1 | 5/2012 | Jung et al. |
| 2012/0104923 | A1 | 5/2012 | Jung et al. |
| 2012/0118002 | A1 | 5/2012 | Kim et al. |
| 2012/0125039 | A1 | 5/2012 | Hwang |
| 2012/0128920 | A1 | 5/2012 | Yoon et al. |
| 2012/0231204 | A1 | 9/2012 | Jeon et al. |
| 2012/0269996 | A1 | 10/2012 | Jäger |
| 2012/0326587 | A1 | 12/2012 | Jeong et al. |
| 2013/0008309 | A1 | 1/2013 | Hashida |
| 2013/0026900 | A1 | 1/2013 | Oh et al. |
| 2013/0099650 | A1 | 4/2013 | Lee et al. |
| 2013/0105494 | A1 | 5/2013 | Jung |
| 2013/0105496 | A1 | 5/2013 | Jung |
| 2013/0195544 | A1 * | 8/2013 | Sanders ................... E04B 2/56 403/268 |
| 2013/0255304 | A1 | 10/2013 | Cur et al. |
| 2013/0257257 | A1 | 10/2013 | Cur |
| 2013/0293080 | A1 | 11/2013 | Kim |
| 2014/0103791 | A1 | 4/2014 | Cheon |
| 2014/0132142 | A1 * | 5/2014 | Kim ...................... F25D 23/087 312/405 |
| 2014/0216100 | A1 | 8/2014 | Toshimitsu |
| 2014/0272208 | A1 | 9/2014 | Song et al. |
| 2014/0315011 | A1 | 10/2014 | Lee et al. |
| 2014/0346942 | A1 | 11/2014 | Kim et al. |
| 2015/0030800 | A1 | 1/2015 | Jung et al. |
| 2015/0068401 | A1 | 3/2015 | Hashida |
| 2015/0192356 | A1 | 7/2015 | Kang et al. |
| 2016/0109172 | A1 | 4/2016 | Kim et al. |
| 2016/0356542 | A1 * | 12/2016 | Kim ...................... E05D 7/1044 |
| 2017/0325634 | A1 | 11/2017 | Cai et al. |
| 2018/0266620 | A1 | 9/2018 | Kawarazaki et al. |
| 2018/0299060 | A1 | 10/2018 | Song et al. |
| 2018/0313492 | A1 | 11/2018 | Kitano et al. |
| 2019/0101320 | A1 | 4/2019 | Dherde et al. |
| 2019/0128593 | A1 | 5/2019 | Deka et al. |

FOREIGN PATENT DOCUMENTS

| | | |
|---|---|---|
| CN | 1276052 | 12/2000 |
| CN | 1286386 | 3/2001 |
| CN | 1515857 | 7/2004 |
| CN | 1576678 | 2/2005 |
| CN | 2700790 | 5/2005 |
| CN | 1666071 | 9/2005 |
| CN | 2748848 | 12/2005 |
| CN | 1731053 | 2/2006 |
| CN | 1820173 | 8/2006 |
| CN | 1896657 | 1/2007 |
| CN | 101072968 | 11/2007 |
| CN | 101171472 | 4/2008 |
| CN | 101349493 A | 1/2009 |
| CN | 201191121 | 2/2009 |
| CN | 201428906 | 3/2010 |
| CN | 201764779 | 3/2011 |
| CN | 102032736 | 4/2011 |
| CN | 201811526 | 4/2011 |
| CN | 102099646 | 6/2011 |

(56) References Cited

FOREIGN PATENT DOCUMENTS

| | | |
|---|---|---|
| CN | 102116402 | 7/2011 |
| CN | 102261470 | 11/2011 |
| CN | 102455103 | 5/2012 |
| CN | 102455104 | 5/2012 |
| CN | 102455105 | 5/2012 |
| CN | 102735013 | 10/2012 |
| CN | 102818421 | 12/2012 |
| CN | 102840729 | 12/2012 |
| CN | 102927740 | 2/2013 |
| CN | 103062981 | 4/2013 |
| CN | 103090615 | 5/2013 |
| CN | 103090616 | 5/2013 |
| CN | 103154648 | 6/2013 |
| CN | 103189696 | 7/2013 |
| CN | 103228851 | 7/2013 |
| CN | 203095854 | 7/2013 |
| CN | 103363764 | 10/2013 |
| CN | 103370587 A | 10/2013 |
| CN | 103542660 | 1/2014 |
| CN | 103575038 | 2/2014 |
| CN | 103649658 | 3/2014 |
| CN | 103968196 | 8/2014 |
| CN | 104180595 | 12/2014 |
| CN | 104204646 | 12/2014 |
| CN | 104254749 | 12/2014 |
| CN | 104344653 | 2/2015 |
| CN | 104457117 A | 3/2015 |
| CN | 104482707 | 4/2015 |
| CN | 104567215 | 4/2015 |
| CN | 104634047 | 5/2015 |
| CN | 104729201 | 6/2015 |
| CN | 104746690 | 7/2015 |
| CN | 105546923 | 5/2016 |
| CN | 108354755 | 8/2018 |
| DE | 956 899 | 1/1957 |
| DE | 28 02 910 | 8/1978 |
| DE | 29 39 878 | 4/1981 |
| DE | 31 21 351 | 12/1982 |
| DE | 9204365 | 7/1992 |
| DE | 197 45 825 | 4/1999 |
| DE | 1 980 3908 | 8/1999 |
| DE | 299 12 917 | 11/1999 |
| DE | 199 07 182 | 8/2000 |
| DE | 10-2011-050473 | 11/2011 |
| DE | 10 2011 014 302 | 9/2012 |
| DE | 10 2011 079 209 | 1/2013 |
| DE | 10-2012-100490 | 7/2013 |
| DE | 10-2012-223539 | 6/2014 |
| EP | 0 071 090 | 2/1983 |
| EP | 0 658 716 A1 | 6/1995 |
| EP | 0 658 733 | 6/1995 |
| EP | 0 892 120 | 1/1999 |
| EP | 1 477 752 | 11/2004 |
| EP | 1 484 563 | 12/2004 |
| EP | 1 614 954 | 1/2006 |
| EP | 2 333 179 | 6/2011 |
| EP | 2 447 639 | 5/2012 |
| EP | 2 806 239 | 11/2014 |
| EP | 2 824 405 | 1/2015 |
| EP | 2 829 827 | 1/2015 |
| EP | 2 936 013 | 10/2015 |
| EP | 2 952 839 | 12/2015 |
| EP | 2 789 951 | 10/2020 |
| GB | 890372 | 2/1962 |
| GB | 2 446 053 | 7/2008 |
| JP | H04-341694 | 11/1992 |
| JP | H05-10494 | 1/1993 |
| JP | H07-234067 | 9/1995 |
| JP | H09-145241 | 6/1997 |
| JP | 11-211334 | 8/1999 |
| JP | H11335114 | 12/1999 |
| JP | 2002-243091 A | 8/2002 |
| JP | 2003-106760 | 4/2003 |
| JP | 2003-269688 | 9/2003 |
| JP | 2004-044980 | 2/2004 |
| JP | 2004-196411 | 7/2004 |
| JP | 2005-214372 | 8/2005 |
| JP | 2007-218509 | 8/2007 |
| JP | 2008-045580 | 2/2008 |
| JP | 2008-249003 | 10/2008 |
| JP | 2009-078261 A | 4/2009 |
| JP | 2010-008011 | 1/2010 |
| JP | 2010008011 A | 1/2010 |
| JP | 2012-087993 | 5/2012 |
| JP | 2012-255607 | 12/2012 |
| JP | 2013-119966 A | 6/2013 |
| JP | 2014-037931 | 2/2014 |
| KR | 10-2001-0073363 | 8/2001 |
| KR | 10-0343719 | 7/2002 |
| KR | 10-0411841 | 12/2003 |
| KR | 10-2005-00658088 | 6/2005 |
| KR | 20070052156 A | 5/2007 |
| KR | 10-2009-0111632 | 10/2009 |
| KR | 10-2010-0097410 | 9/2010 |
| KR | 10-2010-0099629 | 9/2010 |
| KR | 10-2010-0119937 | 11/2010 |
| KR | 10-2010-0136614 | 12/2010 |
| KR | 10-2011-0015322 | 2/2011 |
| KR | 10-2011-0015325 | 2/2011 |
| KR | 10-2011-0015327 | 2/2011 |
| KR | 10-1041086 | 6/2011 |
| KR | 10-2011-0100440 | 9/2011 |
| KR | 10-2012-0044558 | 5/2012 |
| KR | 10-2012-0139648 | 12/2012 |
| KR | 10-1227516 | 1/2013 |
| KR | 10-2013-0048528 | 5/2013 |
| KR | 10-2013-0048530 | 5/2013 |
| KR | 10-2013-0054213 | 5/2013 |
| KR | 10-2014-0129552 | 11/2014 |
| KR | 10-2015-0012712 | 2/2015 |
| KR | 10-1506413 | 3/2015 |
| NL | 1005962 | 11/1998 |
| RU | 129188 | 6/2013 |
| WO | WO 93/25843 | 12/1993 |
| WO | WO 2006/003199 | 1/2006 |
| WO | WO 2012/084874 | 6/2012 |
| WO | WO 2012/176880 | 12/2012 |
| WO | WO 2014/049969 | 4/2014 |
| WO | WO 2014/175639 | 10/2014 |
| WO | WO 2016/208193 A1 | 12/2016 |
| WO | WO 2017/023095 | 2/2017 |
| WO | WO 2017/192121 | 11/2017 |
| WO | WO 2018/044274 | 3/2018 |

OTHER PUBLICATIONS

Chinese Office Action dated Apr. 6, 2021 issued in CN Application No. 202010248789.8.
Chinese Office Action dated Apr. 6, 2021 issued in CN Application No. 202010248791.5.
Chinese Office Action dated Apr. 8, 2021 issued in CN Application No. 202010248891.8.
Chinese Office Action dated Jun. 2, 2021 issued in CN Application No. 202010634146.7.
Chinese Office Action dated Jun. 23, 2021 issued in CN Application No. 202010669915.7.
United States Office Action dated Jun. 28, 2021 issued in co-pending related U.S. Appl. No. 15/749,156.
International Search Report and Written Opinion dated Oct. 12, 2016 issued in Application No. PCT/KR2016/008465.
International Search Report and Written Opinion dated Oct. 12, 2016 issued in Application No. PCT/KR2016/008507.
International Search Report and Written Opinion dated Nov. 21, 2016 issued in Application No. PCT/KR2016/008466.
International Search Report and Written Opinion dated Nov. 21, 2016 issued in Application No. PCT/KR2016/008468.
International Search Report and Written Opinion dated Nov. 21, 2016 issued in Application No. PCT/KR2016/008469.
International Search Report and Written Opinion dated Nov. 21, 2016 issued in Application No. PCT/KR2016/008470.
International Search Report and Written Opinion dated Nov. 21, 2016 issued in Application No. PCT/KR2016/008501.

(56) References Cited

OTHER PUBLICATIONS

International Search Report and Written Opinion dated Nov. 21, 2016 issued in Application No. PCT/KR2016/008502.
International Search Report and Written Opinion dated Nov. 21, 2016 issued in Application No. PCT/KR2016/008505.
International Search Report and Written Opinion dated Nov. 21, 2016 issued in Application No. PCT/KR2016/008519.
International Search Report and Written Opinion dated Nov. 21, 2016 issued in Application No. PCT/KR2016/008523.
International Search Report and Written Opinion dated Dec. 7, 2016 issued in Application No. PCT/KR2016/008516.
International Search Report and Written Opinion dated Dec. 23, 2016 issued in Application No. PCT/KR2016/008512.
International Search Report and Written Opinion dated Dec. 23, 2016 issued in Application No. PCT/KR2016/008514.
Russian Office Action dated Sep. 25, 2018 issued in RU Application No. 2018107646.
European Search Report dated Dec. 21, 2018 issued in EP Application No. 16833330.0.
European Search Report dated Feb. 13, 2019 issued in EP Application No. 16833309.4.
European Search Report dated Feb. 13, 2019 issued in EP Application No. 16833311.0.
European Search Report dated Feb. 20, 2019 issued in EP Application No. 16833313.6.
European Search Report dated Feb. 22, 2019 issued in EP Application No. 16833312.8.
European Search Report dated Feb. 26, 2019 issued in EP Application No. 16833324.3.
European Search Report dated Feb. 26, 2019 issued in EP Application No. 16833336.7.
European Search Report dated Mar. 1, 2019 issued in EP Application No. 16833323.5.
European Search Report dated Mar. 1, 2019 issued in EP Application No. 16833338.3.
European Search Report dated Mar. 13, 2019 issued in EP Application No. 16833331.8.
European Search Report dated Mar. 15, 2019 issued in EP Application No. 16833326.8.
European Search Report dated Apr. 3, 2019 issued in EP Application No. 16833325.0.
U.S. Office Action dated Jun. 13, 2019 issued in related U.S. Appl. No. 15/749,139.
U.S. Office Action dated Jun. 13, 2019 issued in related U.S. Appl. No. 15/749,142.
U.S. Office Action dated Jun. 13, 2019 issued in related U.S. Appl. No. 15/749,136.
Chinese Office Action (with English translation) dated Jul. 15, 2019 issued in CN Application No. 201680045949.0.
Chinese Office Action (with English translation) dated Aug. 5, 2019 issued in CN Application No. 201680045869.5.
Chinese Office Action (with English translation) dated Aug. 5, 2019 issued in CN Application No. 201680045899.6.
Chinese Office Action (with English translation) dated Aug. 5, 2019 issued in CN Application No. 201680045908.1.
Chinese Office Action (with English translation) dated Aug. 5, 2019 issued in CN Application No. 201680045935.9.
Chinese Office Action (with English translation) dated Aug. 5, 2019 issued in CN Application No. 201680046042.6.
Chinese Office Action (with English translation) dated Aug. 5, 2019 issued in CN Application No. 201680046048.3.
Chinese Office Action (with English translation) dated Aug. 13, 2019 issued in CN Application No. 201680045950.3.
Chinese Office Action (with English translation) dated Sep. 19, 2019 issued in CN Application No. 201680045897. 7.
Chinese Office Action (with English translation) dated Sep. 19, 2019 issued in CN Application No. 201680045898.1.
Chinese Office Action (with English translation) dated Sep. 19, 2019 issued in CN Application No. 201680046047.9.
United States Office Action dated Sep. 20, 2019 issued in U.S. Appl. No. 15/749,149.
U.S. Office Action dated Oct. 4, 2019 issued in related U.S. Appl. No. 15/749,140.
U.S. Office Action dated Oct. 17, 2019 issued in U.S. Appl. No. 15/749,147.
U.S. Office Action dated Oct. 17, 2019 issued in U.S. Appl. No. 15/749,143.
U.S. Office Action dated Oct. 17, 2019 issued in U.S. Appl. No. 15/749,162.
United States Office Action dated Dec. 10, 2019 issued in U.S. Appl. No. 15/749,132.
United States Office Action dated Feb. 18, 2020 issued in U.S. Appl. No. 15/749,146.
United States Office Action dated Mar. 20, 2020 issued in U.S. Appl. No. 15/749,162.
United States Office Action dated Mar. 24, 2020 issued in U.S. Appl. No. 15/749,154.
United States Office Action dated Mar. 25, 2020 issued in U.S. Appl. No. 15/749,156.
United States Office Action dated Mar. 27, 2020 issued in U.S. Appl. No. 15/749,149.
United States Office Action dated Apr. 15, 2020 issued in U.S. Application No. 15/749.136.
United States Notice of Allowance dated Apr. 15, 2020 issued in U.S. Appl. No. 15/749,140.
Korean Office Action dated Jun. 5, 2020 issued in Application 10-2017-0093784.
Extended European Search Report dated Jul. 10, 2020 issued in Application 20168389.3.
United States Notice of Allowance dated Aug. 10, 2020 issued in U.S. Appl. No. 15/749,154.
U.S. Office Action dated Sep. 1, 2020 issued in U.S. Appl. No. 15/749,156.
United States Notice of Allowance dated Oct. 21, 2020 issued in U.S. Appl. No. 15/749,154.
Korean Office Action dated Aug. 1, 2021 issued in KR Application No. 10-2021-0085731.
Chinese Office Action dated Aug. 2, 2021 issued in CN Application No. 202010972409.5.
Chinese Office Action dated Aug. 3, 2021 issued in CN Application No. 202010972419.9.
Chinese Office Action dated Aug. 4, 2021 issued in CN Application No. 202010972442.8.
United States Office Action dated Oct. 5, 2021 issued in co-pending related U.S. Appl. No. 16/942,262.
United States Office Action dated Oct. 19, 2021 issued in co-pending related U.S. Appl. No. 17/021,582.
United States Office Action dated Oct. 26, 2021 issued in co-pending related U.S. Appl. No. 16/942,213.
European Search Report dated Oct. 11, 2021 issued in EP Application No. 21185349.4.
European Search Report dated Oct. 11, 2021 issued in EP Application No. 21185362.7.
Chinese Office Action dated Jun. 24, 2021 issued in CN Application No. 202010669926.5.
European Office Action dated Jan. 11, 2021 issued in Application 16 833 313.6.
U.S. Office Action dated Mar. 31, 2021 issued in co-pending U.S. Appl. No. 15/749,132.
Chinese Office Action and Search Report dated Jul. 20, 2021 issued in Application 20101067100.X.
Chinese Office Action dated Dec. 3, 2021 issued in CN Application No. 202110032077.7.
European Search Report dated Feb. 8, 2022 issued in EP Application No. 21203498.7.
United States Office Action dated Mar. 31, 2022 issued in co-pending related U.S. Appl. No. 16/929,523.
U.S. Appl. No. 15/749,132, filed Jan. 31, 2018.
U.S. Appl. No. 17/114,950, filed Dec. 8, 2020.
U.S. Appl. No. 15/749,136, filed Jan. 31, 2018.
U.S. Appl. No. 16/942,262, filed Jul. 29, 2020.
U.S. Appl. No. 15/749,156, filed Jan. 31, 2018.

(56) References Cited

OTHER PUBLICATIONS

Chinese Office Action dated May 18, 2022 issued in CN Application No. 202110718315.X.
United States Office Action dated Jun. 10, 2022 issued in co-pending related U.S. Appl. No. 16/942,213.
United States Office Action dated Jul. 7, 2022 issued in co-pending related U.S. Appl. No. 16/710,720.
United States Office Action dated Jul. 13, 2022 issued in co-pending related U.S. Appl. No. 17/134,911.
United States Office Action dated Jul. 26, 2022 issued in co-pending related U.S. Appl. No. 17/030,806.
Chinese Notice of Allowance dated Jun. 1, 2022 issued in CN Application No. 202110032072.4.
Korean Office Action dated Aug. 8, 2022 issued in KR Application No. 10-2015-0109622.
United States Office Action dated Oct. 6, 2022 issued in co-pending related U.S. Appl. No. 17/072,231.
Korean Notice of Allowance dated Nov. 2, 2022 issued in KR Application No. 10-2015-0109720.
European Search Report dated Nov. 3, 2022 issued in EP Application No. 22151005.0.
United States Office Action dated Dec. 22, 2022 issued in co-pending related U.S. Appl. No. 16/953,846.
U.S. Office Action dated Mar. 20, 2023 issued in copending U.S. Appl. No. 17/030,806.
Machine translation of EP 2 952 839.
U.S. Appl. No. 17/411,659, filed Aug. 25, 2021.
U.S. Appl. No. 17/411,950, filed Dec. 8, 2020.
U.S. Appl. No. 18/091,203, filed Dec. 29, 2022.
U.S. Appl. No. 17/170,005, filed Feb. 8, 2021.
U.S. Appl. No. 17/939,507, filed Sep. 7, 2022.
U.S. Appl. No. 16/942,213, filed Jul. 29, 2020.
U.S. Appl. No. 17/749,679, filed May 20, 2022.
U.S. Appl. No. 17/582,596, filed Jan. 24, 2022.
U.S. Appl. No. 17/030,806, filed Sep. 24, 2020.
U.S. Appl. No. 16/929,523, filed Jul. 15, 2020.
U.S. Appl. No. 16/710,720, filed Dec. 11, 2019.
U.S. Appl. No. 17/021,582, filed Sep. 15, 2020.
U.S. Appl. No. 17/980,088, filed Nov. 3, 2022.
U.S. Appl. No. 17/072,231, filed Oct. 16, 2020.
U.S. Appl. No. 16/953,846, filed Nov. 20, 2020.
U.S. Appl. No. 17/155,430, filed Jan. 22, 2021.
U.S. Appl. No. 17/134,911, filed Dec. 28, 2020.
U.S. Appl. No. 18/091,040, filed Dec. 29, 2022.
U.S. Office Action dated Nov. 25, 2022 issued in related U.S. Appl. No. 17/411,659.
European Office Action dated Nov. 11, 2022 issued in Application 20 168 389.3.
U.S. Office Action dated Apr. 27, 2023 issued in U.S. Appl. No. 17/072,231.
U.S. Notice of Allowance dated Mar. 23, 2023 issued in U.S. Appl. No. 16/953,846.
Korean Office Action dated Jul. 31, 2023 issued in Application 10-2023-0020717.
Chinese Office Action dated Aug. 30, 2023 issued in Application No. 202110718284.8 and English translation.
Korean Office Action dated Nov. 1, 2023 issued in Application 10-2023-0015566.
Korean Office Action dated Nov. 13, 2023 issued in Application No. 10-2023-0014241.
U.S. Office Action dated Nov. 22, 2023 issued in U.S. Appl. No. 17/939,507.

* cited by examiner (a)

(b)

(c)

(a)

(b)

(c)

VACUUM ADIABATIC BODY AND REFRIGERATOR

CROSS-REFERENCE TO RELATED APPLICATIONS

This application is a Continuation Application of U.S. application Ser. No. 15/749,136, filed Jan. 31, 2018, which is a U.S. National Stage Application under 35 U.S.C. § 371 of PCT Application No. PCT/KR2016/008501, filed Aug. 2, 2016, which claims priority to Korean Patent Application No. 10-2015-0109722, filed Aug. 3, 2015, whose entire disclosures are hereby incorporated by reference.

BACKGROUND

1. Field

The present disclosure relates to a vacuum adiabatic body and a refrigerator.

2. Background

A vacuum adiabatic body is a product for suppressing heat transfer by vacuumizing the interior of a body thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced. In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding such as Styrofoam (polystyrene). According to the method, additional foaming is not required, and the adiabatic performance of the refrigerator is improved. However, manufacturing cost is increased, and a manufacturing method is complicated.

As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, manufacturing cost is increased, and a manufacturing method is complicated.

As another example, there is an attempt to manufacture all walls of a refrigerator using a vacuum adiabatic body that is a single product. For example, a technique of providing an adiabatic structure of a refrigerator to be in a vacuum state has been disclosed in U.S. Patent Laid-Open Publication No. US 2004/0026956 A1 (Reference Document 3).

BRIEF DESCRIPTION OF THE DRAWINGS

The embodiments will be described in detail with reference to the following drawings in which like reference numerals refer to like elements wherein:

FIGS. 14(a) and 14(b) are schematic sectional views illustrating a door-in-door refrigerator according to an embodiment, in which FIG. 14(a) illustrates a case where typical foaming urethane is applied and FIG. 14(b) illustrates a case where the vacuum adiabatic body is applied.

DETAILED DESCRIPTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the disclosure may be practiced. These embodiments are described in sufficient detail to enable those skilled in the art to practice the disclosure, and it is understood that other embodiments may be utilized and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense.

In the following description, the term 'vacuum pressure' means a certain pressure state lower than atmospheric pressure. In addition, the expression that a vacuum degree of A is higher than that of B means that a vacuum pressure of A is lower than that of B.

Figure 1:
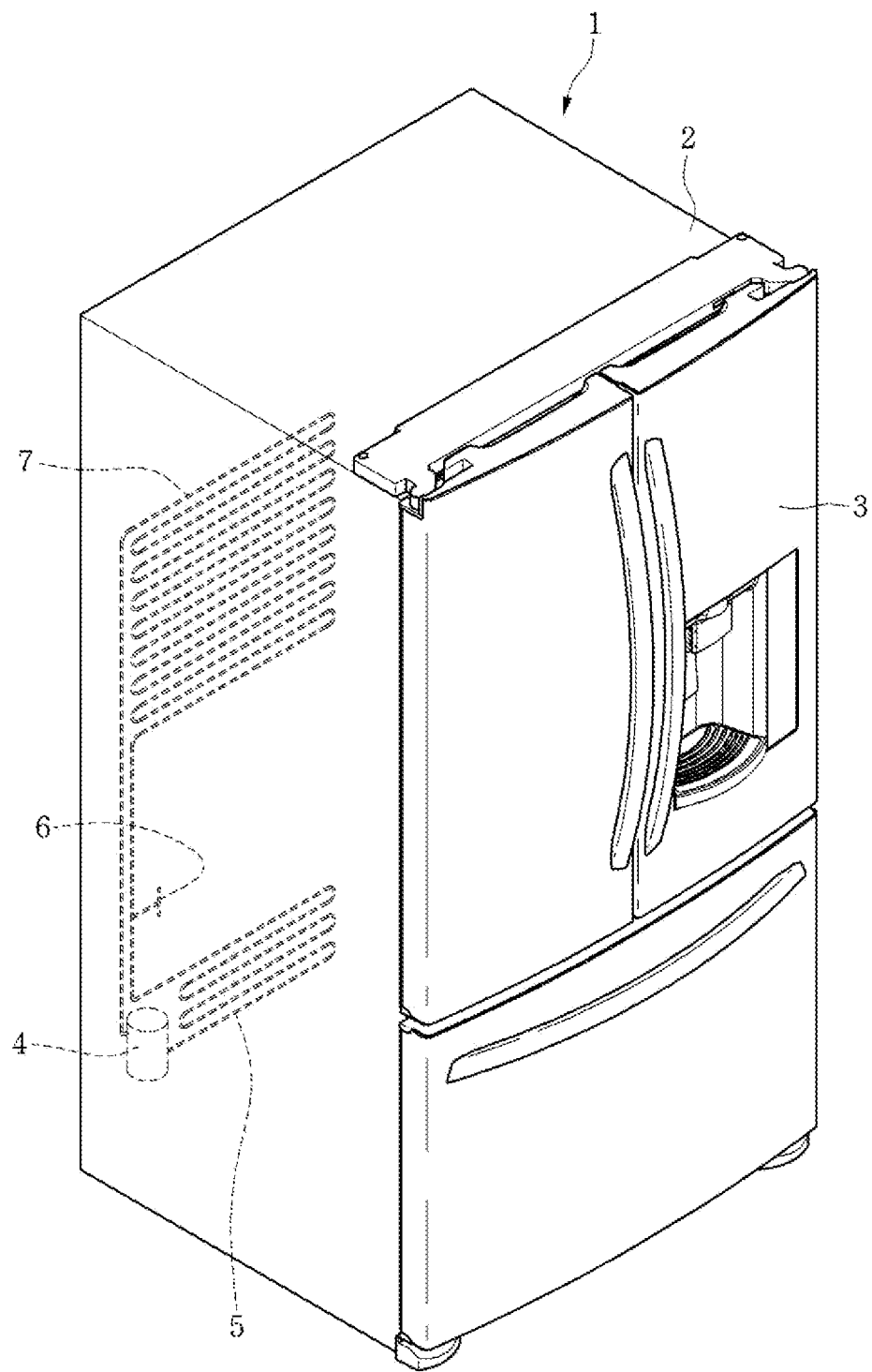
FIG. 1 is a perspective view of a refrigerator according to an embodiment.

FIG. 1 is a perspective view of a refrigerator according to an embodiment. Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle in which cold air is supplied into the cavity 9 may be included. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Figure 2:
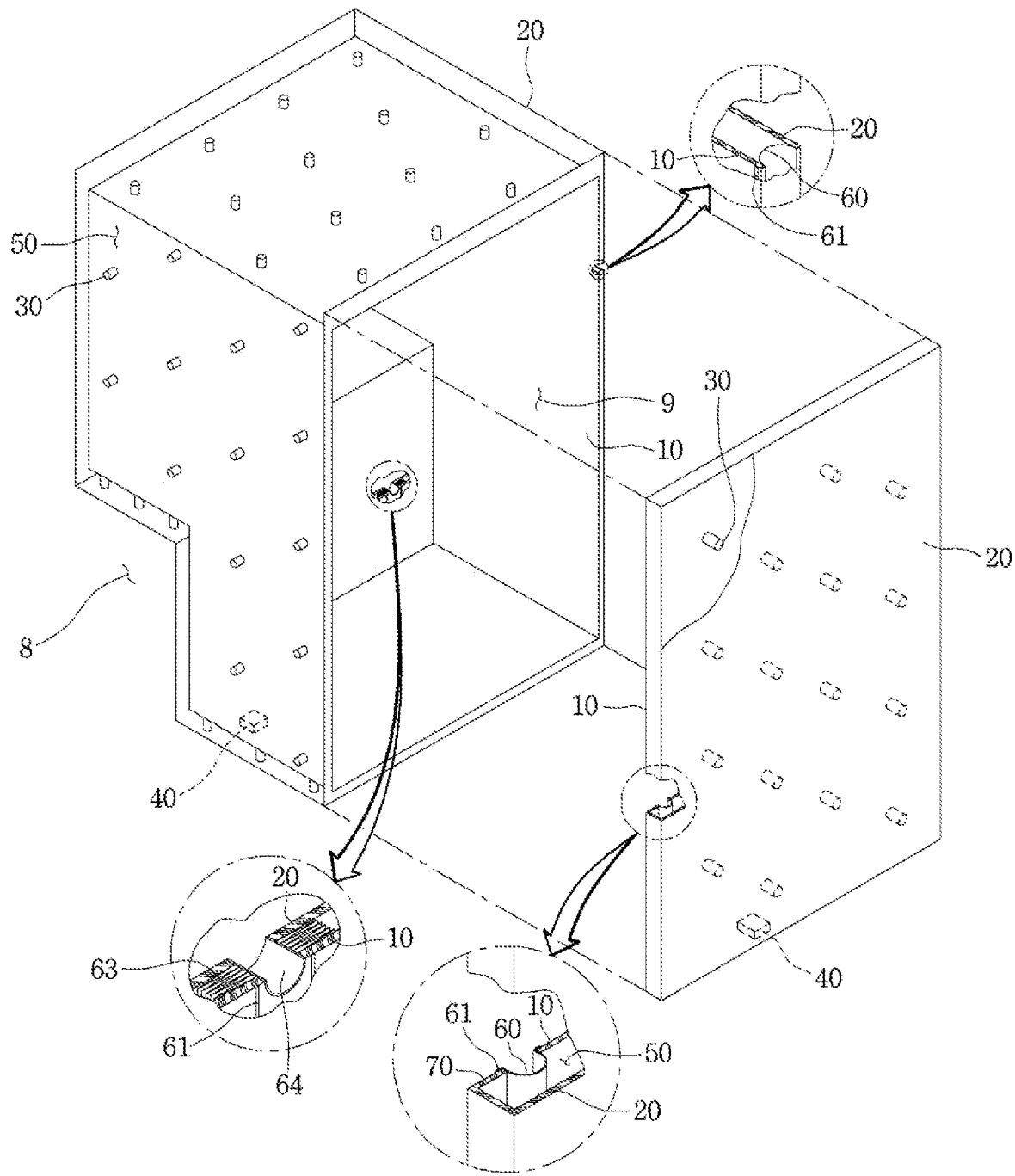
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member (or first plate 10 for providing a wall of a low-temperature space, a second plate member (or second plate) 20 for providing a wall of a high-temperature space, and a vacuum space part (or vacuum space) 50 defined as a gap part between the first and second plate members 10 and 20. Also, the vacuum adiabatic body includes the conductive resistance sheets 60 and 63 for preventing heat conduction between the first and second plate members 10 and 20.

A sealing part (or seal) 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

Figure 3:
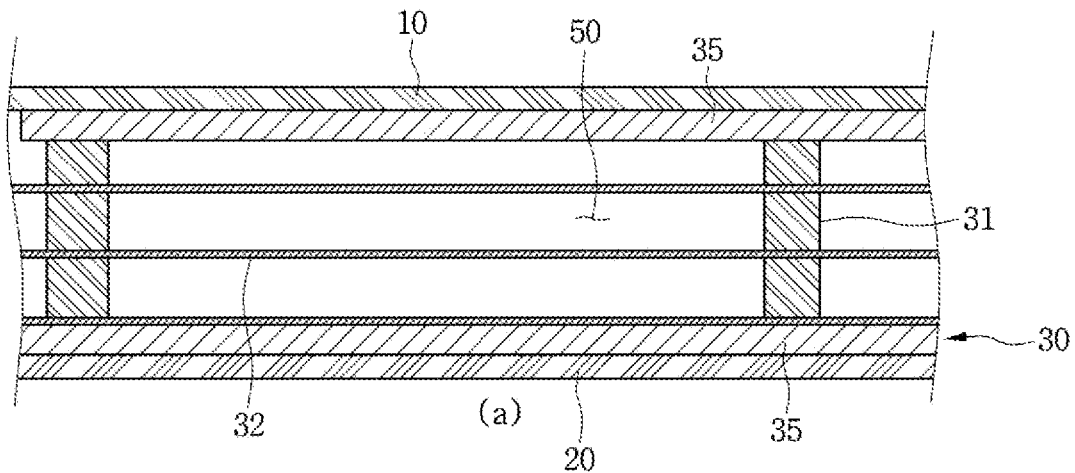
FIG. 3 is a view showing various embodiments of an internal configuration of a vacuum space part.
Figure 3:
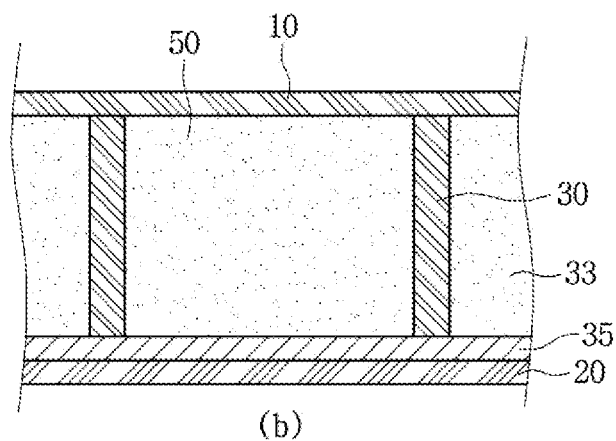
Figure 3:
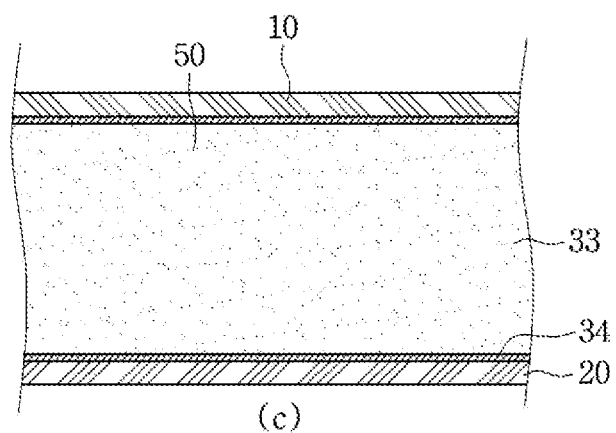

FIG. 3 is a view showing various embodiments of an internal configuration of the vacuum space part. First, referring to FIG. 3a, the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit (or support) 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20.

The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20.

In addition, based on the extending direction of the bars 31, a total sectional area of the support plate 35 is provided to be greater than that of the bars 31, so that heat transferred through the bars 31 can be diffused through the support plate 35. A material of the supporting unit 30 may include a resin selected from the group consisting of PC, glass fiber PC, low outgassing PC, PPS, and LCP so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred.

In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3b, the distance between the plate members is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer. In this embodiment, the vacuum adiabatic body can be manufactured without using the radiation resistance sheet 32.

Referring to FIG. 3c, the supporting unit 30 maintaining the vacuum space part 50 is not provided. Instead of the supporting unit 30, the porous material 33 is provided in a state in which it is surrounded by a film 34. In this case, the porous material 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body can be manufactured without using the supporting unit 30. In other words, the porous material 33 can serve together as the radiation resistance sheet 32 and the supporting unit 30.

Figure 4:
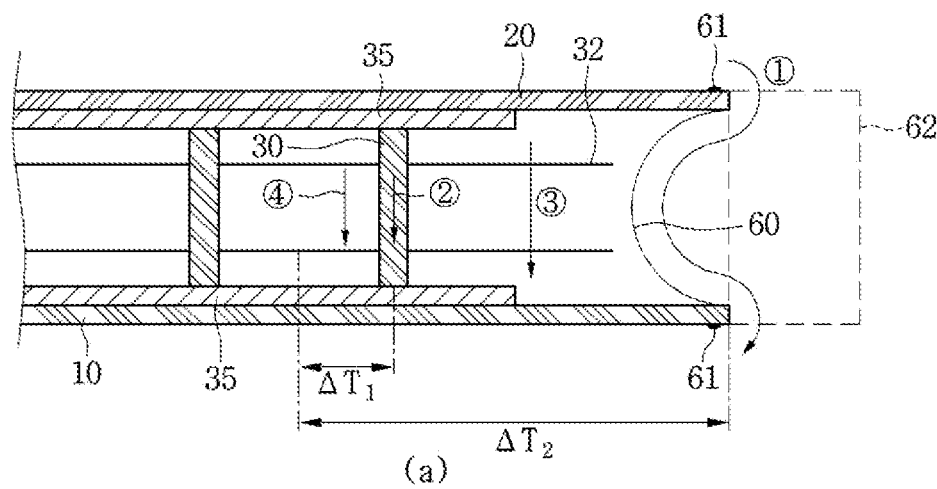
FIG. 4 is a view showing various embodiments of conductive resistance sheets and peripheral parts thereof.
Figure 4:
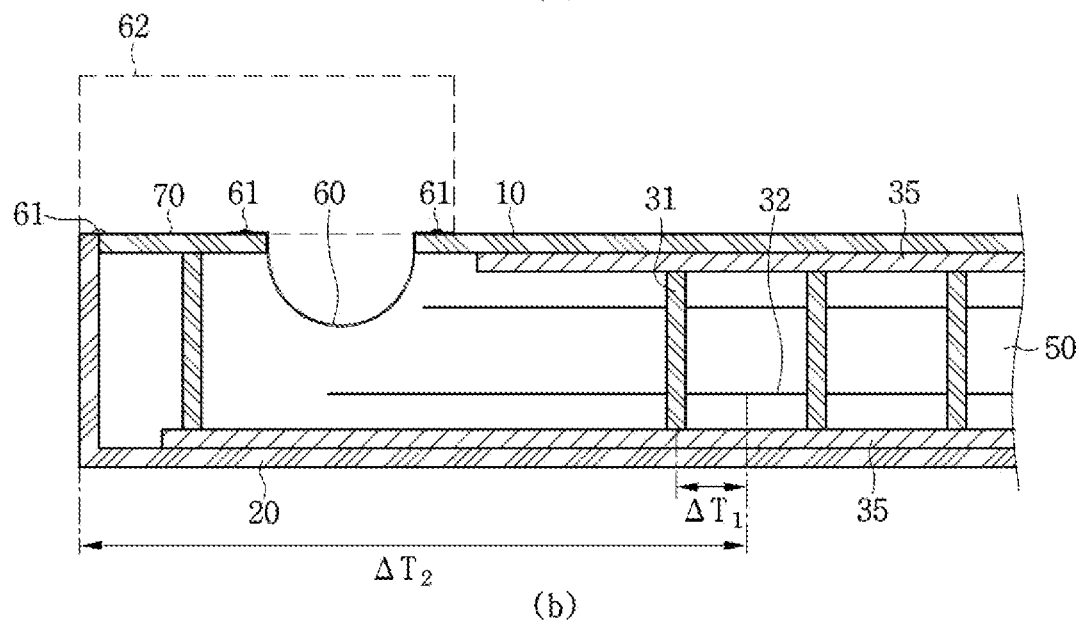
Figure 4:
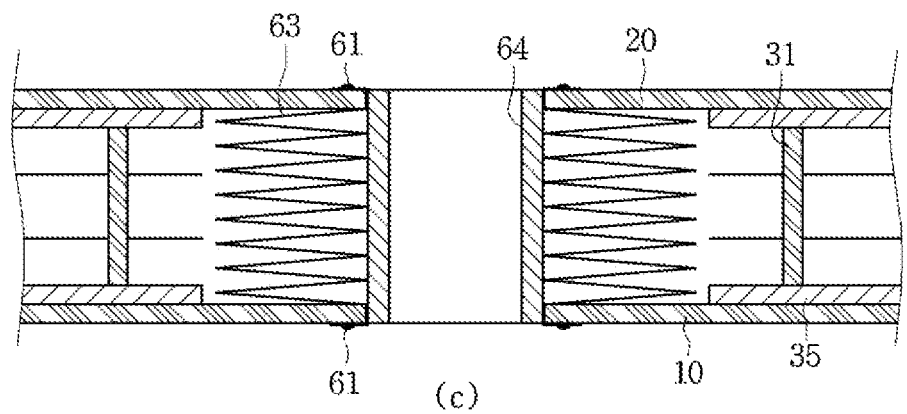

FIG. 4 is a view showing various embodiments of the conductive resistance sheets and peripheral parts thereof. Structures of the conductive resistance sheets are briefly illustrated in FIG. 2, but will be understood in detail with reference to FIG. 4.

First, a conductive resistance sheet proposed in FIG. 4a may be preferably applied to the main body-side vacuum adiabatic body. Specifically, the first and second plate members 10 and 20 are to be sealed so as to vacuumize the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to define at least one portion of the wall for the third space and maintain the vacuum state. The conductive resistance sheet 60 may be provided as a thin foil in units of micrometers so as to reduce the amount of heat conducted along the wall for the third space. The sealing parts may be provided as welding parts. That is, the conductive resistance sheet 60 and the plate members 10 and 20 may be fused to each other.

In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part (or shield) 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous material or a separate adiabatic structure.

A conductive resistance sheet proposed in FIG. 4b may be preferably applied to the door-side vacuum adiabatic body. In FIG. 4b, portions different from those of FIG. 4a are described in detail, and the same description is applied to portions identical to those of FIG. 4a. A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side portion of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4c may be preferably installed in the pipeline passing through the vacuum space part. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat (or convection) ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Figure 1.

$$eK_{solid\ conduction\ heat} > eK_{radiation\ transfer\ heat} > eK_{gas\ conduction\ heat}$$

Math Figure 1

Here, the effective heat transfer coefficient (eK) is a value that can be measured using a shape and temperature differences of a target product. The effective heat transfer coefficient (eK) is a value that can be obtained by measuring a total heat transfer amount and a temperature of at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area ($m^2$) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit.

Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat ⑤ may be changed depending on various variables including a kind, an amount, and the like of the porous material.

According to an embodiment, a temperature difference $\Delta T_1$ between a geometric center formed by adjacent bars 31 and a point at which each of the bars 31 is located may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest.

For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength ($N/m^2$) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may be a bad influence on the external appearance of refrigerator. The radiation resistance sheet 32 may be preferably made of a material that has a low emissivity and can be easily subjected to thin film processing. Also, the radiation resistance sheet 32 is to ensure a strength high enough not to be deformed by an external impact. The supporting unit 30 is provided with a strength high enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a predetermined strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness high enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. The conductive resistance sheet may be preferably made of a material that is easily deformed by the vacuum pressure and has the lowest stiffness. Even when the porous material 33 is filled in the vacuum space part 50, the conductive resistance sheet may preferably have the lowest stiffness, and the plate member and the side frame may preferably have the highest stiffness.

Figure 5:
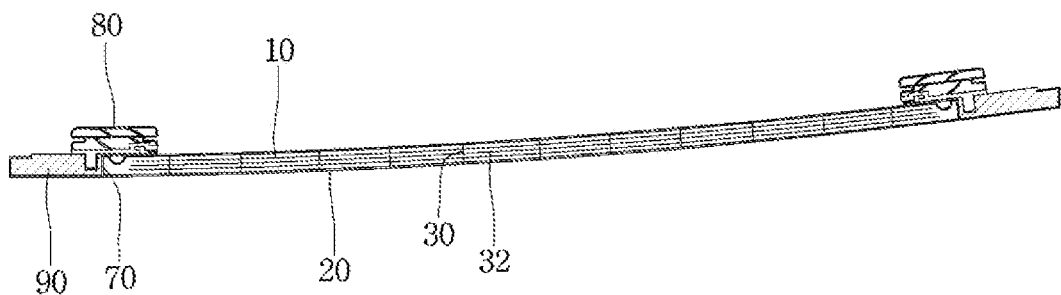
FIG. 5 is a view illustrating in detail a vacuum adiabatic body according to an embodiment.

FIG. 5 is a view illustrating in detail a vacuum adiabatic body according to an embodiment. The embodiment proposed in FIG. 5 may be preferably applied to the door-side vacuum adiabatic body, and the description of the vacuum adiabatic body shown in FIG. 4b among the vacuum adiabatic bodies shown in FIG. 4 may be applied to portions to which specific descriptions are not provided.

Referring to FIG. 5, an inside, i.e., a middle portion of the vacuum adiabatic body may be heat-insulated in a vacuum state, and an edge portion of the vacuum adiabatic body is heat-insulated by a separately molded peripheral adiabatic material or mold 90. The peripheral adiabatic material 90 may be manufactured by fixing a molded product previously formed using an adiabatic material, e.g., EPS (Styrofoam) or EPDM, which has a thermal conductivity of 1 W/mk or less.

A thickness of the peripheral adiabatic material 90 may be provided at a level equal to that of the middle portion of the vacuum adiabatic body. As the middle portion and edge portion of the vacuum adiabatic body are provided to have the same thickness, a slim door can be manufactured. Further, it is possible to maximize the internal volume of a device such as a refrigerator, to which the vacuum adiabatic body is applied. Particularly, an unnecessary space at the edge portion can be removed.

When a space corresponding to the size of the peripheral adiabatic material 90 is formed using foaming urethane, a sufficient adiabatic effect may not be obtained due to a thin thickness of the formed space. Therefore, a separately molded peripheral adiabatic material is preferably provided.

The vacuum adiabatic body of this embodiment includes a first plate member (or first plate) 10 providing a wall for a low-temperature space, a second plate member (or second plate) 20 providing a wall for a high-temperature space, and a vacuum space part (or vacuum space) 50 defined as a space part between the first plate member 10 and the second plate member 20. Also, the vacuum adiabatic body includes a conductive resistance sheet 60 for blocking heat conduction between the first and second plate members 10 and 20.

Also, the vacuum adiabatic body includes a side frame 70 fastened to the conductive resistance sheet 60 and the second plate member 20 to provide a wall for a portion of the vacuum space part 50. Fastening parts of the side frame 70 may be formed through welding. A supporting unit (or support) 30 capable of maintaining a gap of the vacuum space part 50 may be provided inside the vacuum space part 50.

A gasket 80 may be fixed to the peripheral adiabatic material 90. The gasket 80 is preferably provided into a structure in which it at least covers the outside of the conductive resistance sheet 60. Accordingly, the peripheral adiabatic material 90 can provide an adiabatic effect to a region including at least an outer surface of the conductive resistance sheet 60. An inner surface of the conductive resistance sheet 60 may be heat-insulated by the vacuum space part 50, and the outer surface of the conductive resistance sheet 60 may be heat-insulated by the peripheral adiabatic material 90.

As already described above, a sudden change in temperature occurs in the conductive resistance sheet 60, and hence the loss of heat through the outer surface of the conductive resistance sheet 60 may be further increased. Therefore, the conductive resistance sheet 60 is preferably heat-insulated by the gasket 80. It can be easily considered that the gasket 80 can shield first and second spaces from each other.

As already described above, the peripheral adiabatic material 90 is provided the edge portion of the vacuum adiabatic body. The thickness of the peripheral adiabatic material 90 is provided at a level equal to that of the middle portion of the vacuum adiabatic body so as to implement a slim door. When the improvement of adiabatic performance is further required, the peripheral adiabatic material 90 may be provided to have a thickness about two times greater than that of the middle portion of the vacuum adiabatic body.

If the thickness of the peripheral adiabatic material 90 is decreased, the peripheral adiabatic material 90 cannot provide a thickness where a hinge shaft is installed at the peripheral adiabatic material. Since parts such as a torsion spring are inserted into the hinge shaft, the peripheral adiabatic material 90 requires a predetermined thickness or more. Therefore, when a door is provided using the vacuum adiabatic material, a hinge shaft 96 constituting a hinge 95 (see FIG. 6) may be provided to the main body. When two doors are provided, the hinge shaft 96 may be installed at an inner door capable of ensuring a constant thickness. Therefore, as the other end of the hinge, instead of the hinge shaft, is fastened by a fastening tool such as a screw, the vacuum adiabatic body may be fastened.

In this case, the hinge shaft 96 serving as a rotating shaft may become more distant from the gasket 80. When the distance between the hinge shaft 96 and the gasket 80 is increased, the gasket 80 can be less pushed when the vacuum adiabatic body as the door is opened or closed. For example, when the door is closed, one side of the gasket 80 contacts the main body, and the other side of the gasket 80 then contacts the main body. After the one side of the gasket 80 contacts the main body, the one side of the gasket 80 is not slipped with respect to the main body by its friction with the main body. Therefore, the gasket 80 may be deformed.

As the distance between the rotating shaft and the gasket 80 is increased, a deformation of the gasket 80 may be decreased, and thus the operational reliability of the gasket 80 can be improved. For example, the gasket 80 itself or a distance between parts adjacent to the gasket 80 can be maintained to have an originally designed numerical value. In this case, the degradation of adiabatic performance of the conductive resistance sheet 60 can be accurately prevented. Particularly, it is possible to prevent the degradation of adiabatic performance of the conductive resistance sheet 60 due to deterioration of the gasket 80, which may occur when the gasket 80 is used for a long period of time.

Figure 6:
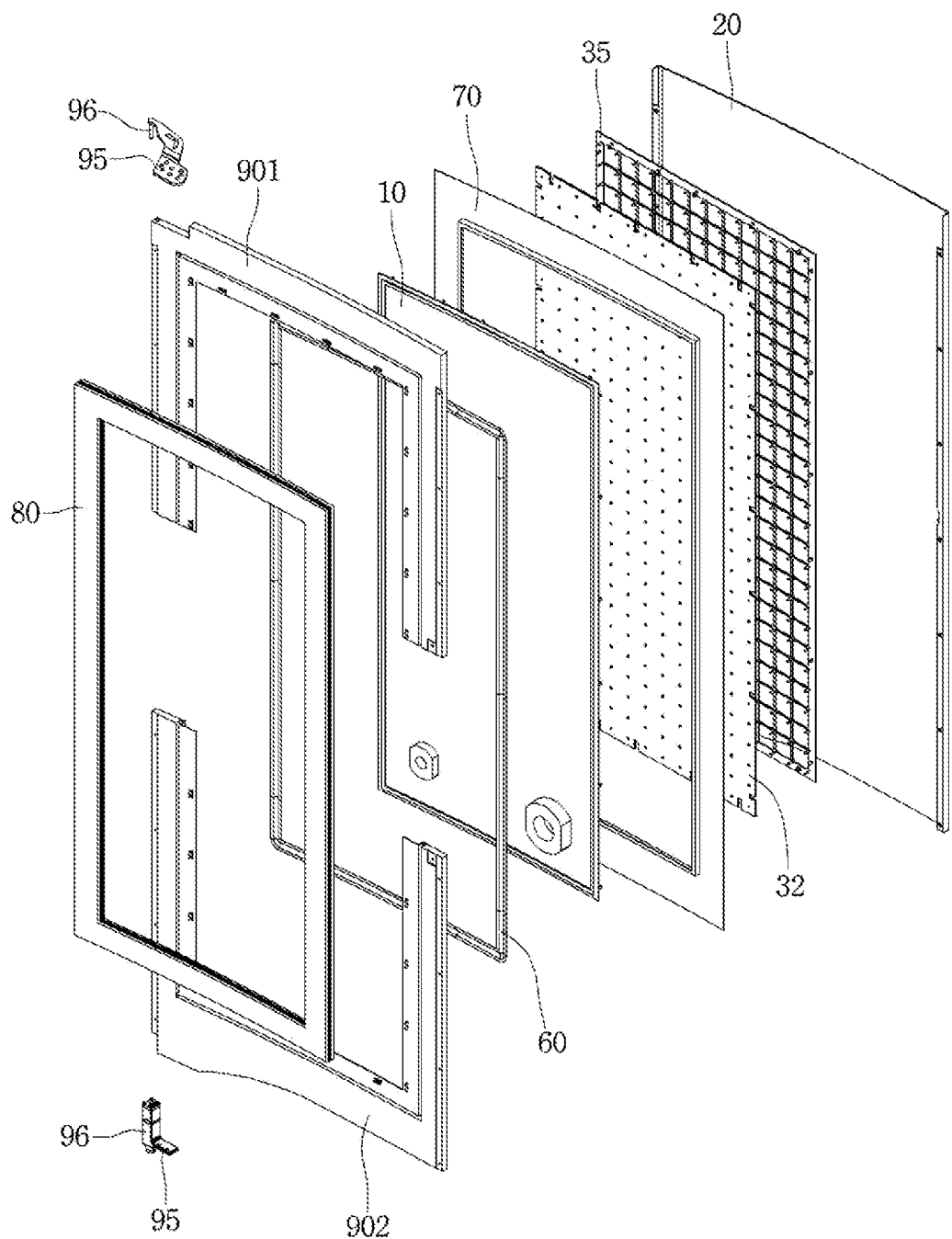
FIG. 6 is an exploded perspective view of the vacuum adiabatic body according to the embodiment.

FIG. 6 is an exploded perspective view of the vacuum adiabatic body according to the embodiment. Referring to FIG. 6, the first plate member 10 and the second plate member 20 are provided to form the vacuum space part 50. The first plate member 10 may be provided at one portion of an inner surface of the second plate member 20, and an edge region of the vacuum adiabatic body, in which the first plate member 10 is not provided, may be heat-insulated by the peripheral adiabatic material 90.

The peripheral adiabatic material 90 may be provided in a shape in which it is divided into a first peripheral adiabatic material 901 and a second peripheral adiabatic material 902. The peripheral adiabatic material 90 is provided for convenience of fastening, and may be provided in another shape. The fastening between the first and second peripheral adiabatic materials 901 and 902 will be described later.

An exhaust port 40 and a getter port 41 may be provided at predetermined positions of the first plate member 10. The conductive resistance sheet 60 is provided at the outer circumference of the first plate member 10, and the side frame 70 is fastened to the conductive resistance sheet 60 and the second plate member 20 to provide the vacuum space part 50 as a sealing space. Here, the position at which the side frame 70 and the second plate member 20 are fastened to each other may be provided as an edge portion of the second plate member 20. Thus, it is possible to prevent formation of dews due to cold air transferred along the side frame 70. Further, it is possible to a user not to view, with the naked eye, deformation of the second plate member 20, caused by heat generated when the side frame 70 and the second plate member 20 are fastened to each other.

The supporting unit 30 for maintaining the gap of the vacuum space part 50 is provided inside the vacuum space part 50, and a radiation resistance sheet 32 may be provided to obtain a radiation adiabatic effect.

The edge portion of the vacuum adiabatic body is heat-insulated by the peripheral adiabatic material 90. More specifically, the first and second peripheral adiabatic materials 901 and 902 are provided in a shape in which they are bent twice to be respectively inserted from upper and lower sides of the vacuum adiabatic body. The first and second peripheral adiabatic materials 901 and 902 may be fixed by being held to at least one part of the side frame 70 and the first plate member 10. This will be described in detail later. In addition, the gasket 80 may be fastened to the peripheral adiabatic body 90.

The hinges 95 may be fastened to upper and lower ends of the vacuum adiabatic body, respectively. The hinge shaft 96 of the hinge 95 may be placed at the outside of the vacuum adiabatic body. The hinge shaft 96 may be fixed to the main body in the refrigerator.

Figure 7:
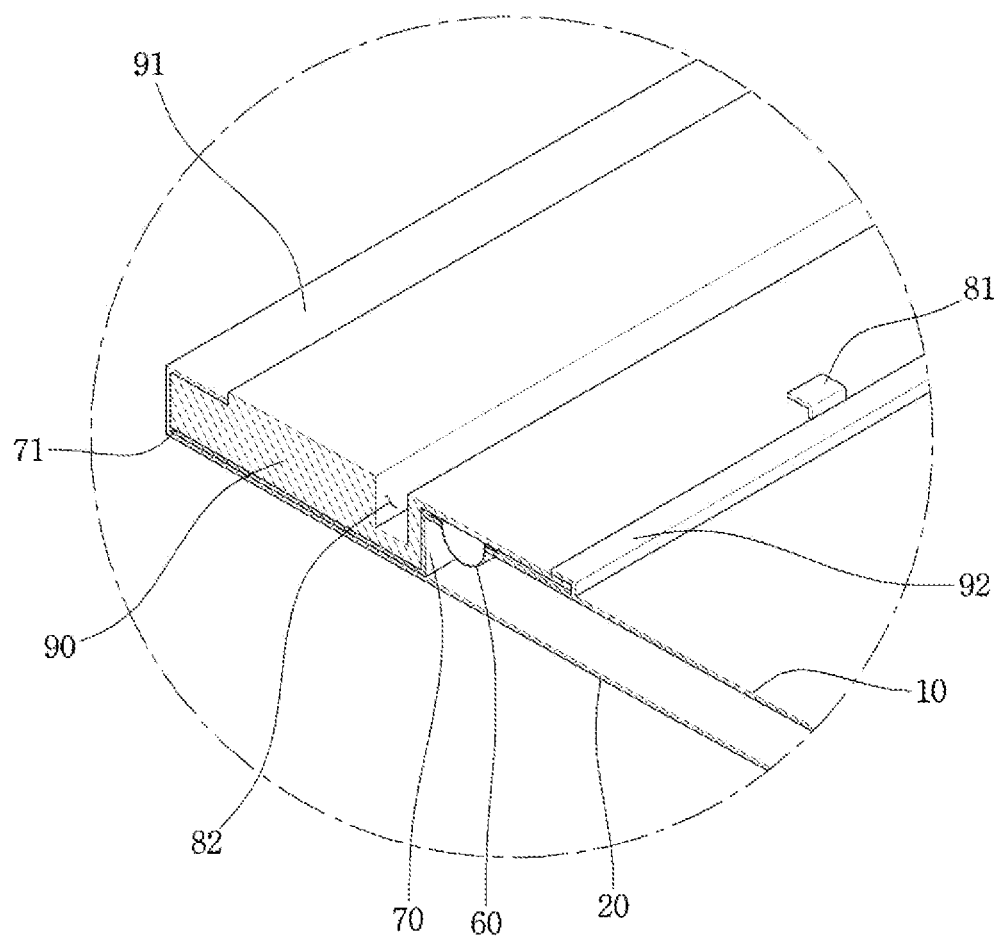
FIG. 7 is a sectional view of any one edge portion of the vacuum adiabatic body.

FIG. 7 is a sectional view of any one edge portion of the vacuum adiabatic body. Referring to FIG. 7, the first plate member 10 and the second plate member 20 form the vacuum space part 50, and the second plate member 20 is bent to further extend from the vacuum space part 50. Specifically, an end portion of the second plate member 20 is bent in a pocket shape to provide a first adiabatic material holding end (or first bracket) 91. The first adiabatic material holding end 91 may be provided at only a left/right edge portion of the vacuum adiabatic body to support the peripheral adiabatic material 90. If the peripheral adiabatic material 90 is inserted at a left/right side, the first adiabatic material holding end 91 may be provided at only an upper/lower edge portion of the vacuum adiabatic body.

A second adiabatic material holding end (or second bracket) 92 may be provided at an end portion of the first plate member 10. As both end portions of the peripheral adiabatic material 90 are held to the first and second adiabatic material holding ends 91 and 92, respectively, the peripheral adiabatic material 90 can be fixed. According to the above-described structure, the position of the peripheral adiabatic material 90 can be fixed in such a manner that the peripheral adiabatic material 90 is held to the first and second adiabatic material holding ends 91 and 92 and then slid more deeply.

Although it is illustrated that the peripheral adiabatic material 90 does not contact a curve-shaped outer surface of the conductive resistance sheet 60, the present disclosure is not limited thereto, and the peripheral adiabatic material 90 may be provided in a shape in which it covers the outer surface of the conductive resistance sheet 60. The peripheral adiabatic material 90 may be fixed by the action in which the first adiabatic material holding end 91 and the side frame 70 push each other between the first adiabatic material holding end 91 and a vertical bending portion provided to the side frame 70. An end portion of the side frame 70 may be fastened as, for example, a welding part, at the edge portion of the second plate member 20.

A groove 82 may be provided in an inner surface of the peripheral adiabatic material 90, and a gasket holding end or tab 81 may be provided at another side of the peripheral adiabatic material 90. According to the above-described structure, when an outer appearance of the gasket 80 is formed, a pocket through which the gasket holding end 81 can be held may be provided, and a member that can be forcibly inserted into the groove 82 may be provided. According to the above-described configuration, when the gasket 80 is fixed, the gasket holding end 81 is inserted and fixed into the pocket, and then the member is forcibly inserted into the groove 82, thereby fixing the gasket 80. The gasket 80 may be provided as a member having elasticity, and hence the above-described forcible insertion can be easily derived as the gasket 80 is deformed while the gasket 80 is being inserted.

Figure 8:
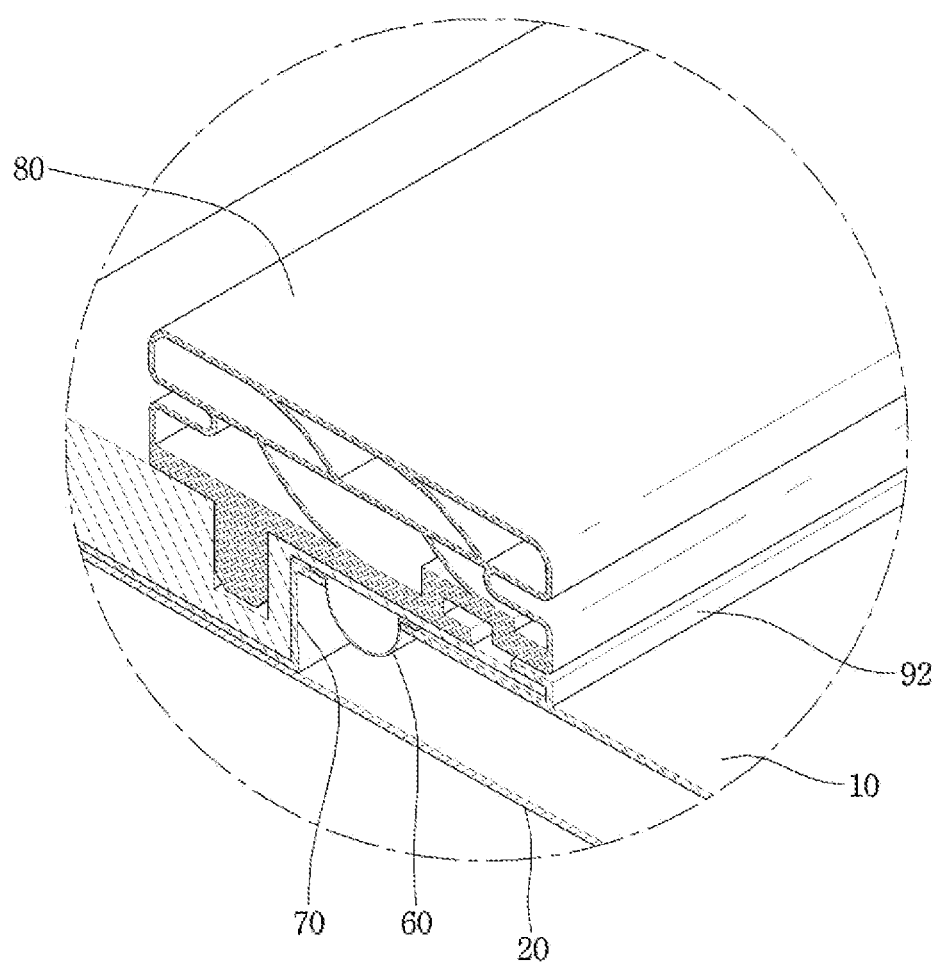
FIG. 8 is a view illustrating a state in which a gasket is fixed to a peripheral adiabatic material.

FIG. 8 is a view illustrating a state in which the gasket is fixed to the peripheral adiabatic material. Referring to FIG. 8, it can be seen that the gasket is stably fixed by the groove and the gasket holding end. Meanwhile, the gasket 80 may perform heat insulation by covering the outside of the conductive resistance sheet 60. Thus, the reliability of heat insulation can be further improved with respect to a portion at which a sudden change in temperature occurs.

Figure 9:
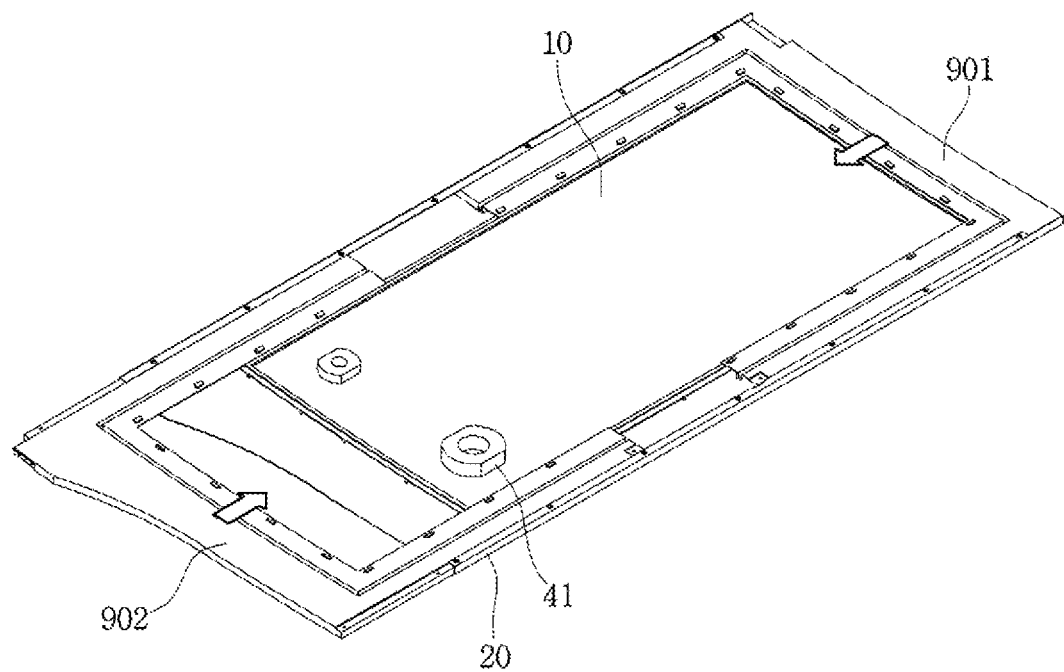
FIG. 9 is a view showing a process of fastening the peripheral adiabatic material.

FIG. 9 is a view showing a process of fastening the peripheral adiabatic material. Referring to FIG. 9, any one entry portion of the peripheral adiabatic material 90 is inserted into the adiabatic material holding ends 91 and 92, and the peripheral adiabatic material 90 is further inserted up to the end in the length direction of the adiabatic material holding ends 91 and 92, thereby fastening the peripheral adiabatic material 90.

Meanwhile, the peripheral adiabatic material 90 is a separate molded product made of resin, and hence a contact force of the peripheral adiabatic material 90 with another part may be lowered. When the contact force is decreased, adiabatic loss may occur due to a gap between the peripheral adiabatic material 90 and the other part. When an assembly tolerance is decreased so as to increase the contact force, friction is increased in the insertion of the peripheral adiabatic material 90, and therefore, it may be difficult to insert the peripheral adiabatic material 90. An embodiment capable of solving this problem will be proposed.

Figure 10:
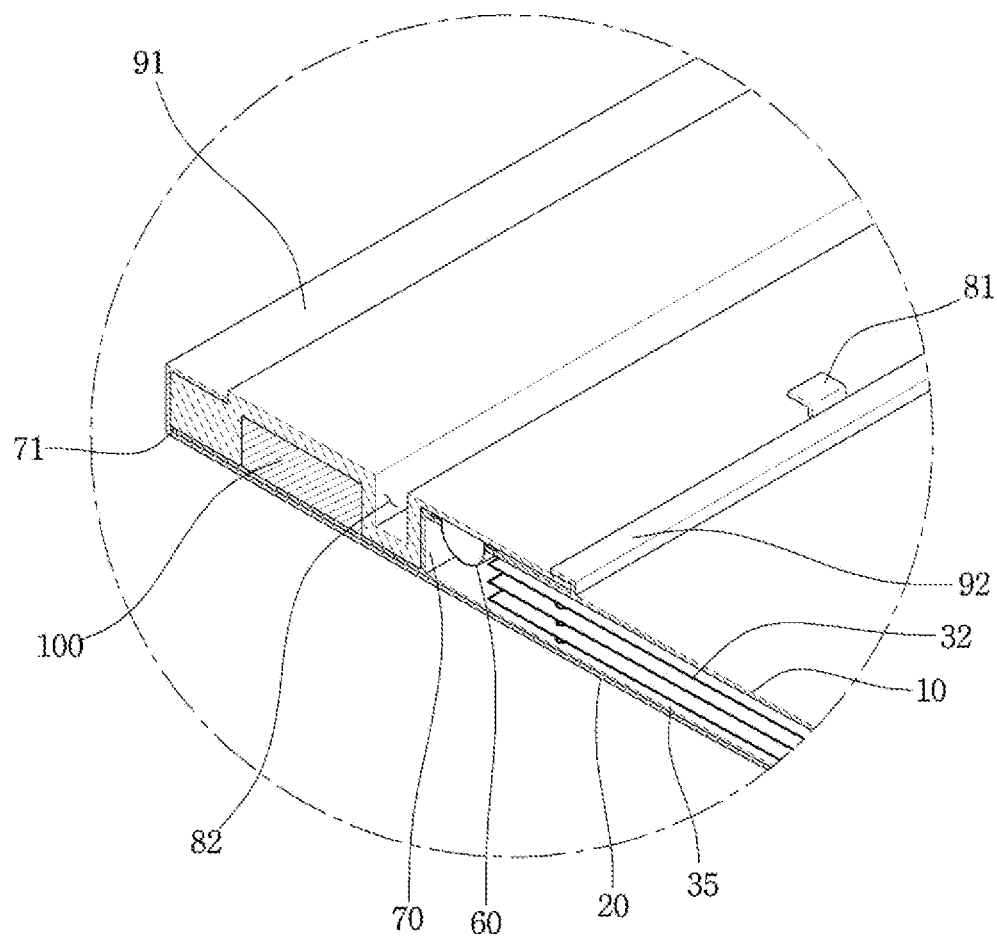
FIG. 10 is a sectional view of an edge portion of a vacuum adiabatic body according to an embodiment.

FIG. 10 is a sectional view of an edge portion of a vacuum adiabatic body according to an embodiment. Referring to FIG. 10, one portion of the internal space of a peripheral adiabatic material 90 is provided as an empty space. A separate adiabatic material may be additionally inserted into the empty space. The separate adiabatic material may be named as a side frame adiabatic material or mold 100.

If the side frame adiabatic material 100 is inserted into the internal space of the peripheral adiabatic material 90, the outer portion of the peripheral adiabatic material 90 can be further adhered closely to a side frame 70. It will be apparent that the side frame adiabatic material 100 is further adhered closely to the side frame 70. In addition, the peripheral adiabatic material 90 that may have difficulty in insertion can be more easily inserted into adiabatic material holding ends 91 and 92 by deformation of the empty space, which occurs during the insertion. After the peripheral adiabatic material 90 is inserted, the side frame adiabatic material 100 is further inserted into the empty space, so that the peripheral adiabatic material 90 and the side frame 70 can more accurately contact each other. The same material as the peripheral adiabatic material 90 may be used as a material of the side frame adiabatic material 100.

Hereinafter, a vacuum pressure preferably determined depending on an internal state of the vacuum adiabatic body will be described. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part 50 may resist the heat transfer by applying only the supporting unit 30. Alternatively, the porous material 33 may be filled together with the supporting unit in the vacuum space part 50 to resist the heat transfer. Alternatively, the vacuum space part may resist the heat transfer not by applying the supporting unit but by applying the porous material 33.

Figure 11:
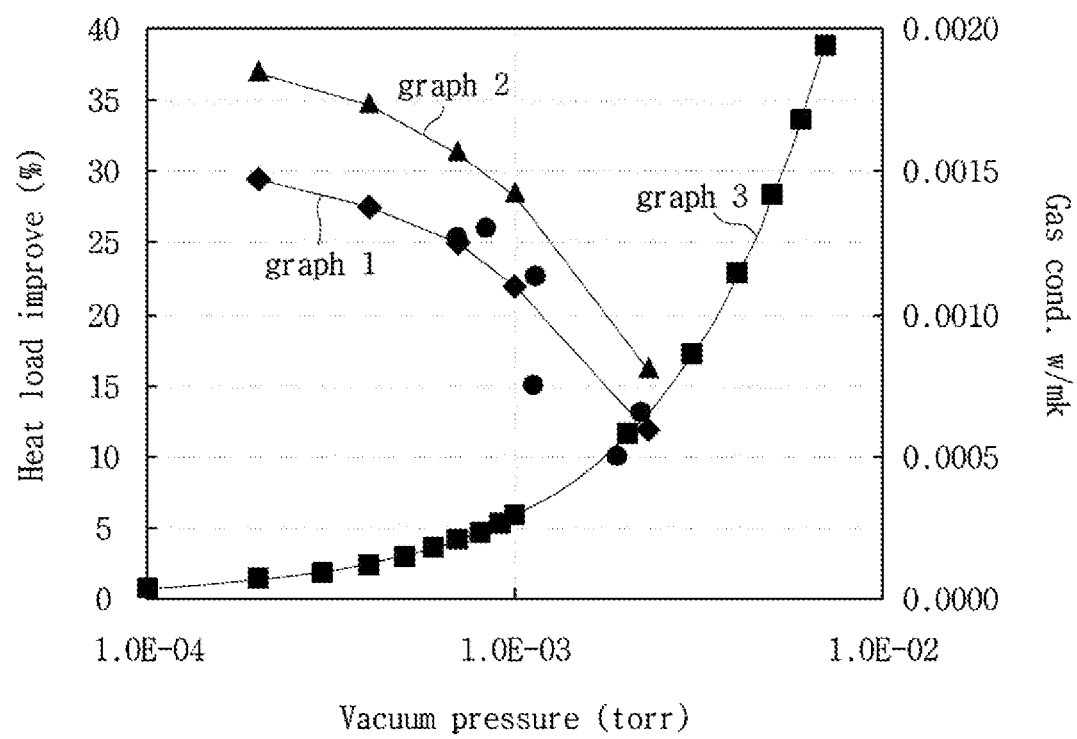
FIG. 11 illustrates graphs showing changes in adiabatic performance and changes in gas conductivity with respect to vacuum pressures by applying a simulation.

The case where only the supporting unit is applied will be described. FIG. 11 illustrates graphs showing changes in adiabatic performance and changes in gas conductivity with respect to vacuum pressures by applying a simulation. Referring to FIG. 11, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased.

However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

Figure 12:
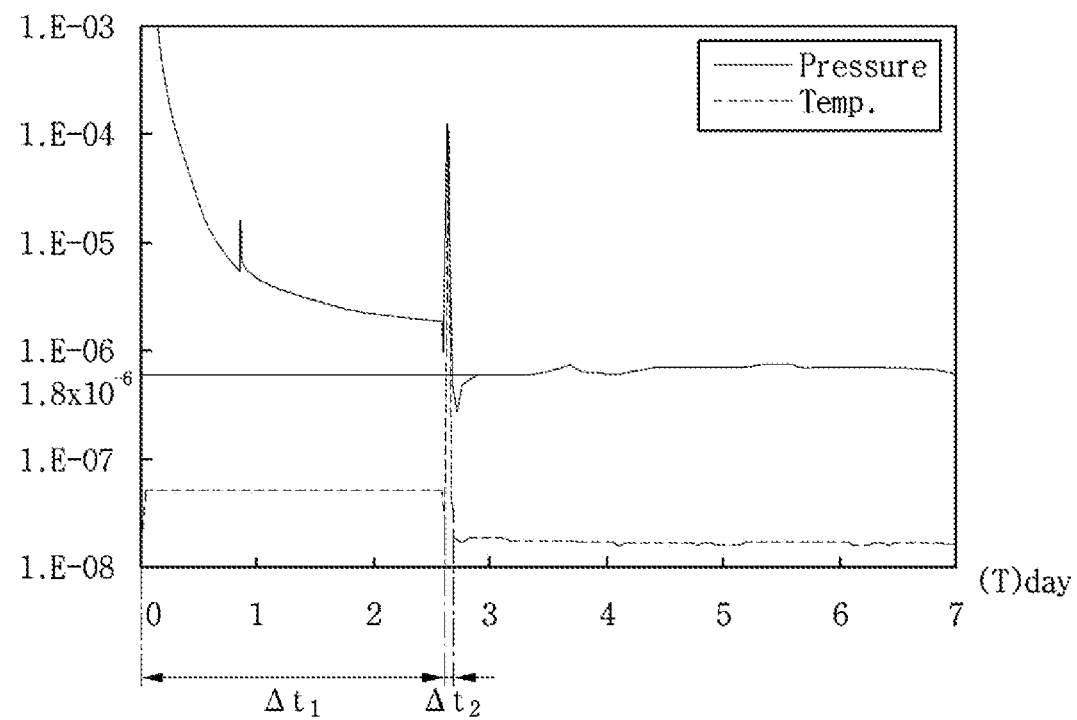
FIG. 12 illustrates graphs obtained by observing, over time and pressure, a process of exhausting the interior of the vacuum adiabatic body when a supporting unit is used.

FIG. 12 illustrates graphs obtained by observing, over time and pressure, a process of exhausting the interior of the vacuum adiabatic body when the supporting unit is used. Referring to FIG. 12, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta t1$).

After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr. In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8\times10^{-6}$ Torr.

Figure 13:
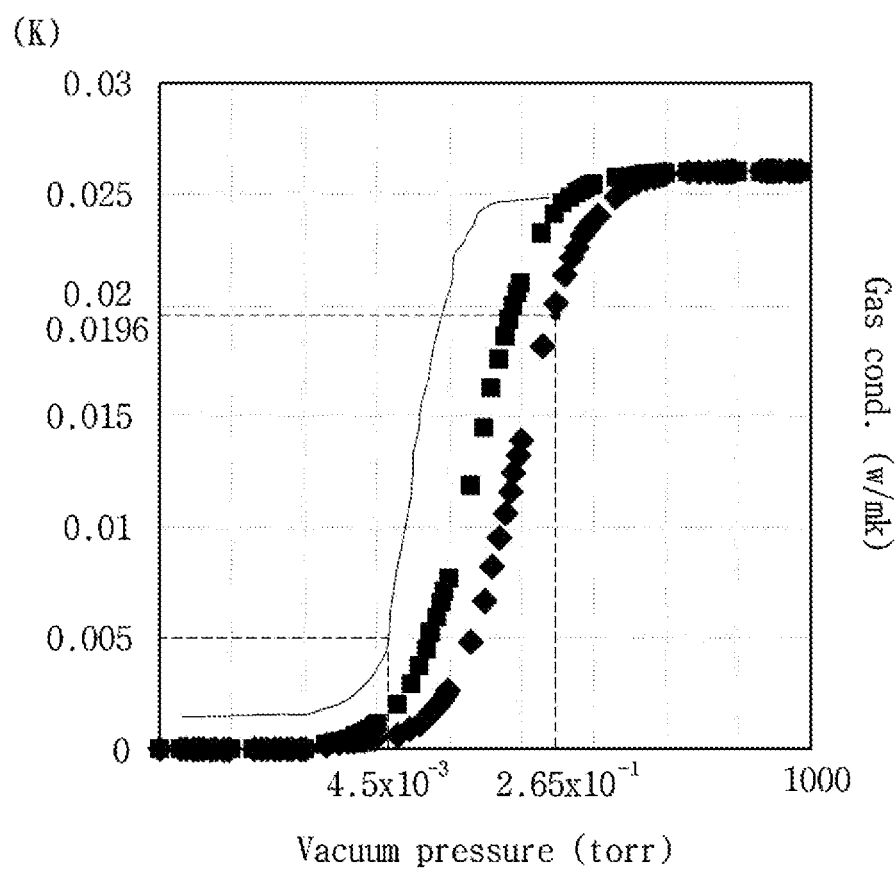
FIG. 13 illustrates graphs obtained by comparing vacuum pressures and gas conductivities.

FIG. 13 illustrates graphs obtained by comparing vacuum pressures and gas conductivities. Referring to FIG. 13, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm.

The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to an adiabatic material formed by foaming polyurethane, the vacuum pressure is $2.65\times10^{-1}$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5\times10^{-3}$ Torr. The vacuum pressure of $4.5\times10^{-3}$ Torr can be defined as the point at which the reduction in adiabatic effect caused by gas conduction heat is saturated. Also, when the effective heat transfer coefficient is 0.1 W/mK, the vacuum pressure is $1.2\times10^{-2}$ Torr.

When the vacuum space part 50 is not provided with the supporting unit but provided with the porous material, the size of the gap ranges from a few micrometers to a few hundredths of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0\times10^{-4}$ Torr.

Also, the vacuum pressure at the point at which the reduction in adiabatic effect caused by gas conduction heat is saturated is approximately $4.7\times10^{-2}$ Torr. Also, the pressure where the reduction in adiabatic effect caused by gas conduction heat reaches the typical effective heat transfer coefficient of 0.0196 W/mK is 730 Torr. When the supporting unit and the porous material are provided together in the vacuum space part, a vacuum pressure may be created and used, which is middle between the vacuum pressure when only the supporting unit is used and the vacuum pressure when only the porous material is used.

Figure 14:
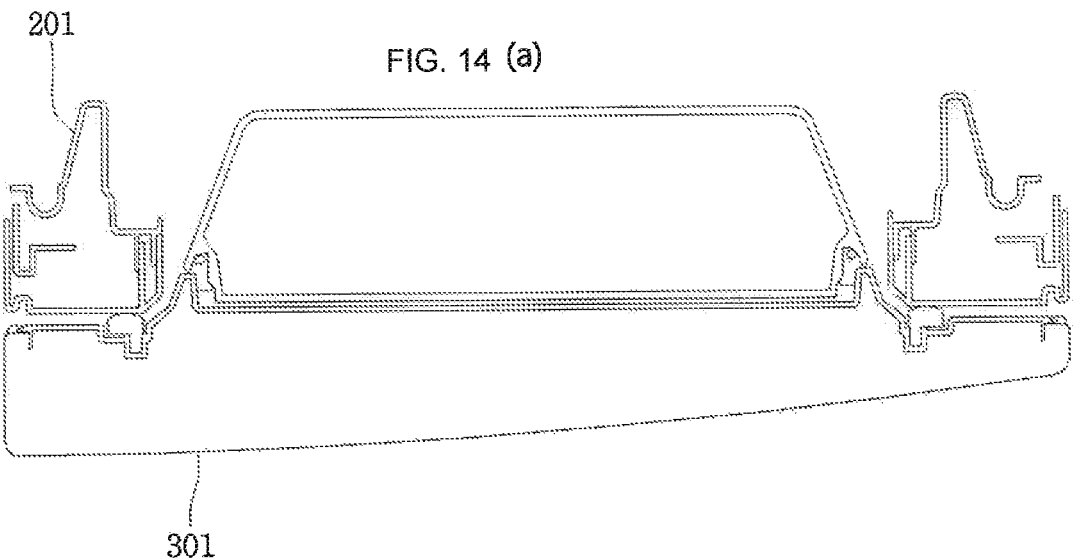
Figure 14:
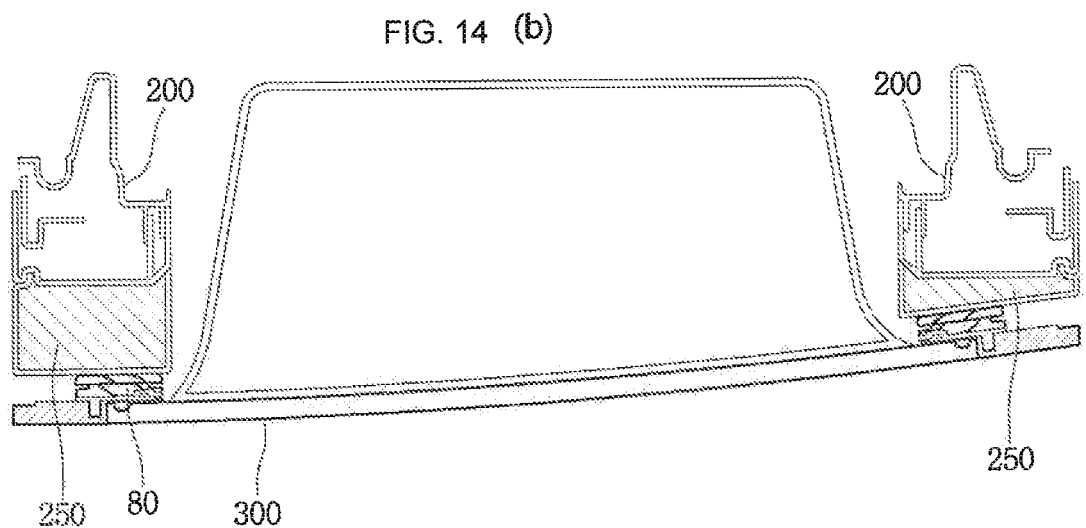

FIG. 14(a) is a schematic sectional view illustrating a door-in-door refrigerator and where typical foaming urethane is applied. FIG. 14(b) illustrates a case where a vacuum adiabatic body is applied to a door-in-door refrigerator.

Referring to FIGS. 14(a) and 14(b), the door-in-door refrigerator includes a first door 300 or 301 placed at the outside thereof and a second door 200 or 201 placed at the inside thereof. As shown in FIG. 14(a) typical foaming urethane is applied to the first door 301, and hence the width in the front-rear direction, where a basket is placed, may be narrowed. On the other hand, as shown in FIG. 14(b), the first door 300 of the embodiment can be manufactured as a slim door, and hence it can be expected that the width in the front-rear direction, where a basket is placed, will be widened.

In order to maximize such an advantage of the slim door, it is preferably considered that the width of the second door 200 in the front-rear direction is provided to be long. For example, a door expanding part (or door spacer) 250 may be provided to compensate the second door 200 for a thickness corresponding to a width decreased as the door using the typical foaming urethane is replaced with the slim door of the embodiment. The door expanding part 250 may be equipped with parts necessary for an operation thereof. Alternatively, an additional adiabatic material may be provided in the door expanding part 250 so as to obtain an adiabatic effect.

In the description of the present disclosure, a part for performing the same action in each embodiment of the vacuum adiabatic body may be applied to another embodiment by properly changing the shape or dimension of the other embodiment. Accordingly, still another embodiment can be easily proposed. For example, in the detailed description, in the case of a vacuum adiabatic body suitable as a door-side vacuum adiabatic body, the vacuum adiabatic body may be applied as a main body-side vacuum adiabatic body by properly changing the shape and configuration of a vacuum adiabatic body.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The vacuum adiabatic body proposed in the present disclosure may be preferably applied to refrigerators. However, the application of the vacuum adiabatic body is not limited to the refrigerators, and may be applied in various apparatuses such as cryogenic refrigerating apparatuses, heating apparatuses, and ventilation apparatuses.

According to the present disclosure, the vacuum adiabatic body can be industrially applied to various adiabatic apparatuses. The adiabatic effect can be enhanced, so that it is possible to improve energy use efficiency and to increase the effective volume of an apparatus.

However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of Reference Document 3 is limited to cryogenic refrigerating apparatuses, and is not applied to refrigerating apparatuses used in general households.

Embodiments provide a vacuum adiabatic body and a refrigerator, which can obtain a sufficient adiabatic effect in a vacuum state and be applied commercially. In one embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit for decreasing a heat transfer amount between the first plate member and the second plate member; an exhaust port through which a gas in the third space is exhausted; a peripheral adiabatic material, as a previously formed separate molded product, fixed to an edge of the third space; and a gasket having at least one portion fixed to the peripheral adiabatic material to provide a boundary between the first space and the second space.

The vacuum adiabatic body may include: a conductive resistance sheet capable of resisting thermal conduction flowing along a wall for the third space; and a side frame providing at least one outer wall for the third space, the side frame being fastened to the second plate member and the conductive resistance sheet. The peripheral adiabatic material may be held to at least one of the first plate member, the second plate member, and the side frame, so that a position of the peripheral adiabatic material is fixed.

The vacuum adiabatic body may include a side frame adiabatic material inserted into an empty space of the peripheral adiabatic material, to increase a contact force of the peripheral adiabatic material with an external part of the peripheral adiabatic material. The peripheral adiabatic material may be made of EPS or EPDM. A thickness of the peripheral adiabatic material may be equal to or greater than a height of the third space, and may be provided equal to or smaller than twice of the height of the third space.

The vacuum adiabatic body may further include a conductive resistance sheet capable of resisting heat conduction flowing along the wall for the third space. The peripheral adiabatic material may perform heat insulation by covering the conductive resistance sheet. The gasket may perform heat insulation by covering the conductive resistance sheet at an outside of the peripheral adiabatic material.

The peripheral adiabatic material may include a first peripheral adiabatic material and a second peripheral adiabatic material as two different members separated from each other. The first peripheral adiabatic material and the second peripheral adiabatic material may contact each other at two different spots. The vacuum adiabatic body may include an adiabatic material holding end formed by bending an edge portion of the second plate member to fix the peripheral adiabatic material.

In another embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit for decreasing a heat transfer amount between the first plate member and the second plate member; an exhaust port through which a gas in the third space is exhausted; and a peripheral adiabatic material, as a previously formed separate molded product, fixed to an edge of the third space.

The heat resistance unit may include at least one conductive resistance sheet provided as a curved surface thinner than each of the first and second plate members to resist heat conduction flowing along a wall for the third space. The peripheral adiabatic material may be provided to cover the conductive resistance sheet.

A vacuum degree of the third space may be equal to or greater than $1.8 \times 10^{-6}$ Torr and equal to or smaller than $4.5 \times 10^{-3}$ Torr. The heat resistance unit may include at least one radiation resistance sheet provided in a plate shape inside the third space or may include a porous material to resist radiation heat transfer between the second plate member and the first plate member inside the third space. The sealing part may include a welding part.

In still another embodiment, a refrigerator includes: a main body provided with an internal space in which storage goods are stored; and a door provided to open/close the main body from an external space, wherein, in order to supply a refrigerant into the main body, the refrigerator includes: a compressor for compressing the refrigerant; a condenser for condensing the compressed refrigerant; an expander for expanding the condensed refrigerant; and an evaporator for evaporating the expanded refrigerant to take heat, wherein the door includes a vacuum adiabatic body, wherein the vacuum adiabatic body includes: a first plate member defining at least one portion of a wall for the internal space; a second plate member defining at least one portion of a wall for the external space; a sealing part sealing the first plate member and the second plate member to provide a vacuum space part that has a temperature between a temperature of the internal space and a temperature of the external space and is in a vacuum state; a supporting unit maintaining the vacuum space part; a heat resistance unit at least including a conductive resistance sheet capable of resisting heat conduction flowing along a wall for the third space to decrease a heat transfer amount between the first plate member and the second plate member; an exhaust port through which a gas in the vacuum space part is exhausted; and a peripheral adiabatic material, as a previously formed separate molded product, fixed to an edge of the third space, wherein the refrigerator further includes a hinge rotatably supporting the main body and the door, wherein a hinge shaft of the hinge is fastened to the main body, and at least one portion of the hinge is fastened to the peripheral adiabatic material.

The peripheral adiabatic material may include a first peripheral adiabatic material and a second peripheral adiabatic material as two different members separated from each other. The first peripheral adiabatic material and the second peripheral adiabatic material may contact each other at two different spots.

The refrigerator may include a gasket fixed to the peripheral adiabatic material to provide a boundary between the first space and the second space, the gasket covering the conductive resistance sheet. The refrigerator may include a side frame adiabatic material inserted into an empty space of the peripheral adiabatic material, to increase a contact force of the peripheral adiabatic material with an external part of the peripheral adiabatic material.

According to the present disclosure, it is possible to obtain a sufficient vacuum adiabatic effect. According to the present disclosure, it is possible to implement a slim door. According to the present disclosure, it is possible to implement a slim door that can be industrially applied to products such as refrigerators.

The details of one or more embodiments are set forth in the accompanying drawings and the description below. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum adiabatic body comprising:
a first plate to have a first temperature;
a second plate to have a second temperature different than the first temperature;
a seal configured to seal the first plate and the second plate and to provide an inner space, and the inner space is to be provided in a vacuum state;
a shielding part configured to provide an adiabatic effect, and the shielding part is disposed outside the inner space; and
a peripheral adiabatic body configured as a portion of the vacuum adiabatic body, and at least one portion of the shielding part to be fixed to the peripheral adiabatic body,
wherein the peripheral adiabatic body includes a first peripheral adiabatic material provided in a shape that is bent twice and a second peripheral adiabatic material provided in a shape that is bent twice.

2. The vacuum adiabatic body according to claim 1, comprising a conductive resistance sheet configured to reduce heat transfer between the first plate and the second plate,
wherein the shielding part is disposed to cover the conductive resistance sheet.

3. The vacuum adiabatic body according to claim 1, comprising a conductive resistance sheet configured to reduce heat transfer between the first plate and the second plate,
wherein the shielding part is disposed at an exterior of the conductive resistance sheet, or the shielding part is disposed at a position facing the conductive resistance sheet, or the shielding part is disposed to contact at least the conductive resistance sheet.

4. The vacuum adiabatic body according to claim 1, wherein the shielding part is a structure having porous material.

5. The vacuum adiabatic body according to claim 1, wherein the shielding part is a separate adiabatic structure.

6. The vacuum adiabatic body according to claim 1, wherein the shielding part is a gasket.

7. The vacuum adiabatic body according to claim 1, wherein an end of the peripheral adiabatic body is provided in a pocket, and the shielding part is fixed to a top of the peripheral adiabatic body.

8. The vacuum adiabatic body according to claim 1, wherein the peripheral adiabatic body is a previously formed separate molded product.

9. A vacuum adiabatic body comprising:
a first plate to have a first temperature;
a second plate to have a second temperature different than the first temperature;
a vacuum space provided between the first plate and the second plate, and the vacuum space is to be provided in a vacuum state;
a shielding part configured to provide an adiabatic effect, and the shielding part is disposed outside the vacuum space;
a peripheral adiabatic body configured as a portion of the vacuum adiabatic body, and at least one portion of the shielding part to be fixed to the peripheral adiabatic body; and
a hinge, wherein at least one portion of the hinge is fastened to the peripheral adiabatic body, and
wherein the hinge includes a shaft of the hinge and a hinge mounting part, wherein the hinge mounting part is coupled to the peripheral adiabatic body without being provided in the shaft such that the shaft of the hinge become more distant from the shielding part.

10. The vacuum adiabatic body according to claim 9, wherein the hinge is to rotatably support a main body and a door, wherein the shaft of the hinge is to fasten to the main body.

11. The vacuum adiabatic body according to claim 9, wherein the hinge is to rotatably support an inner door and an outer door, wherein the shaft of the hinge is to fasten to the inner door.

12. A vacuum adiabatic body comprising:
a first plate to have a first temperature;
a second plate to have a second temperature different than the first temperature;
a vacuum space provided between the first plate and the second plate, and the vacuum space is to be provided in a vacuum state;
a shielding part configured to provide an adiabatic effect, and the shielding part is disposed outside the vacuum space;
a peripheral adiabatic body configured as a portion of the vacuum adiabatic body, and at least one portion of the shielding part to be fixed to the peripheral adiabatic body; and
a hinge, wherein at least one portion of the hinge is fastened to the peripheral adiabatic body, and
wherein the hinge includes a hinge shaft, wherein the hinge shaft is disposed outside of the vacuum adiabatic body, and
wherein the hinge shaft is fixed to at least one portion of a component, the component having an additional adiabatic material and being adjacent to the peripheral adiabatic body.

13. The vacuum adiabatic body according to claim 12, wherein the component includes a main body having a storage space, or a door configured to open/close an internal space from an external space.

14. The vacuum adiabatic body according to claim 12, wherein a torsion spring is inserted into the hinge shaft.

15. The vacuum adiabatic body according to claim 12, wherein the peripheral adiabatic body includes a support portion to accommodate the at least one portion of the hinge.

16. The vacuum adiabatic body according to claim 12, wherein the peripheral adiabatic body includes a hole, and the at least one portion of the hinge is to be inserted in the hole.

17. A vacuum adiabatic body comprising:
a first plate to have a first temperature;
a second plate to have a second temperature different than the first temperature;
a vacuum space provided between the first plate and the second plate, and the vacuum space is to be provided in a vacuum state;
a shielding part configured to provide an adiabatic effect, and the shielding part is disposed outside the vacuum space;
an expanding part provided on the shielding part, the expanding part having additional adiabatic material; and
an air gap provided between the expanding part and the first plate, and the air gap is provided between an inner edge of the expanding part and an inner edge of the shielding part.

18. The vacuum adiabatic body according to claim 17, wherein the expanding part has a first portion and a second portion that is larger than the first portion the second portion is to contact the shielding part, and the first portion is to not contact the shielding part.

19. The vacuum adiabatic body according to claim 17, wherein a length of the air gap provided between the expanding part and the first plate is longer than a length of the air gap that is provided between the inner edge of the expanding part and the inner edge of the shielding part.

20. A vacuum adiabatic body comprising:
a first plate to have a first temperature;
a second plate to have a second temperature different than the first temperature;
a vacuum space provided between the first plate and the second plate, and the vacuum space is to be provided in a vacuum state;
a shielding part configured to provide an adiabatic effect, and the shielding part is disposed outside the vacuum space; and
a peripheral adiabatic body configured as a portion of the vacuum adiabatic body, and at least one portion of the shielding part to be fixed to the peripheral adiabatic body,
wherein the peripheral adiabatic body includes a groove configured to receive a portion of the shielding part inserted into the groove and a gasket holding end configured to be inserted into and fixed to another portion of the shielding part, the groove being an empty space in an inner surface of the peripheral adiabatic body, and the gasket holding end to protrude from the inner surface of the peripheral adiabatic body.

21. The vacuum adiabatic body according to claim 20, wherein the groove is displaced lower than the gasket holding end.

* * * * *